(12) United States Patent
Hwang et al.

(10) Patent No.: US 10,428,452 B2
(45) Date of Patent: Oct. 1, 2019

(54) WALL-MOUNTED DRUM TYPE WASHING MACHINE

(71) Applicant: Dongbu Daewoo Electronics Corporation, Seoul (KR)

(72) Inventors: Ui Kun Hwang, Bucheon-si (KR); Ju Dong Lee, Incheon (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 146 days.

(21) Appl. No.: 15/408,244

(22) Filed: Jan. 17, 2017

(65) Prior Publication Data

US 2017/0121896 A1    May 4, 2017

Related U.S. Application Data

(63) Continuation of application No. 14/119,434, filed as application No. PCT/KR2012/010517 on Dec. 6, 2012.

(30) Foreign Application Priority Data

Dec. 8, 2011  (KR) .................. 10-2011-0131335
Apr. 4, 2012  (KR) .................. 10-2012-0035171

(51) Int. Cl.
*D06F 39/12* (2006.01)
*D06F 37/26* (2006.01)
(Continued)

(52) U.S. Cl.
CPC ............ *D06F 39/125* (2013.01); *B29C 45/00* (2013.01); *D06F 37/206* (2013.01); *D06F 37/22* (2013.01); *D06F 37/264* (2013.01);

*D06F 37/267* (2013.01); *D06F 39/005* (2013.01); *D06F 39/04* (2013.01); *D06F 39/083* (2013.01); *D06F 39/088* (2013.01); *D06F 39/12* (2013.01); *D06F 39/14* (2013.01); *B29C 45/164* (2013.01); *D06F 37/02* (2013.01); *D06F 2212/02* (2013.01)

(58) Field of Classification Search
CPC ............................ D06F 39/022; D06F 39/028
See application file for complete search history.

(56) References Cited

U.S. PATENT DOCUMENTS 3,471,940 A  10/1969  Smith
5,135,197 A   8/1992  Kelley
(Continued)

FOREIGN PATENT DOCUMENTS

CN  101008147 A   8/2007
CN  201151831 Y  11/2008
(Continued)

OTHER PUBLICATIONS

Sung Gon Kim, et al., Korean Patent Abstracts, Abstract of 2003055780000, Feb. 26, 2003, 2 pages, Korea Intellectual Property Rights Information Service, Republic of Korea.
(Continued)

*Primary Examiner* — Spencer E Bell

(57) ABSTRACT

A wall-mounted drum type washing machine includes a rear panel mounted on a wall surface; a tub containing wash water; a box unit coupled to the rear panel and surrounding the tub; and a reinforcement portion connecting the tub and the rear panel and surrounding the tub.

19 Claims, 51 Drawing Sheets

(51) Int. Cl.
*D06F 39/00* (2006.01)
*D06F 39/04* (2006.01)
*D06F 39/08* (2006.01)
*D06F 37/22* (2006.01)
*D06F 37/02* (2006.01)
*B29C 45/00* (2006.01)
*D06F 39/14* (2006.01)
*D06F 37/20* (2006.01)
*B29C 45/16* (2006.01)

(56) References Cited

U.S. PATENT DOCUMENTS

| | | |
|---|---|---|
| 5,421,175 A | 6/1995 | Niu |
| 2007/0175245 A1 | 8/2007 | Kim et al. |
| 2009/0126415 A1 | 5/2009 | Lyu et al. |
| 2009/0133281 A1* | 5/2009 | Yoon .............. D06F 39/008 34/72 |
| 2009/0165506 A1 | 7/2009 | Marquina et al. |
| 2010/0000578 A1* | 1/2010 | Hendrickson ........ D06F 39/022 134/34 |
| 2011/0265524 A1 | 11/2011 | Kim et al. |
| 2012/0233873 A1 | 9/2012 | Del Pos et al. |
| 2012/0242205 A1 | 9/2012 | Del Pos et al. |

FOREIGN PATENT DOCUMENTS

| | | |
|---|---|---|
| JP | 2010-046348 A | 3/2010 |
| JP | 4439371 B2 | 3/2010 |
| KR | 1991-0000404 Y1 | 6/1990 |
| KR | 10-1997-0075082 A | 12/1997 |
| KR | 10-2002-0056323 A | 7/2002 |
| KR | 20-0305578 Y1 | 2/2003 |
| KR | 200305578 Y1 | 2/2003 |
| KR | 10-2003-0092185 A | 12/2003 |
| KR | 10-2005-0114451 A | 12/2005 |
| KR | 10-2007-0004506 A | 1/2007 |
| WO | 2011051176 A1 | 5/2011 |
| WO | 2011051184 A1 | 5/2011 |

OTHER PUBLICATIONS

International Search Report dated Mar. 14, 2013, International application No. PCT/KR2012/010517, Korean Intellectual Property Office, Republic of Korea.

Chinese Office Action dated Nov. 16, 2017 issued in corresponding Chinese Patent Application No. 201610663547.9 and English translation thereof.

* cited by examiner

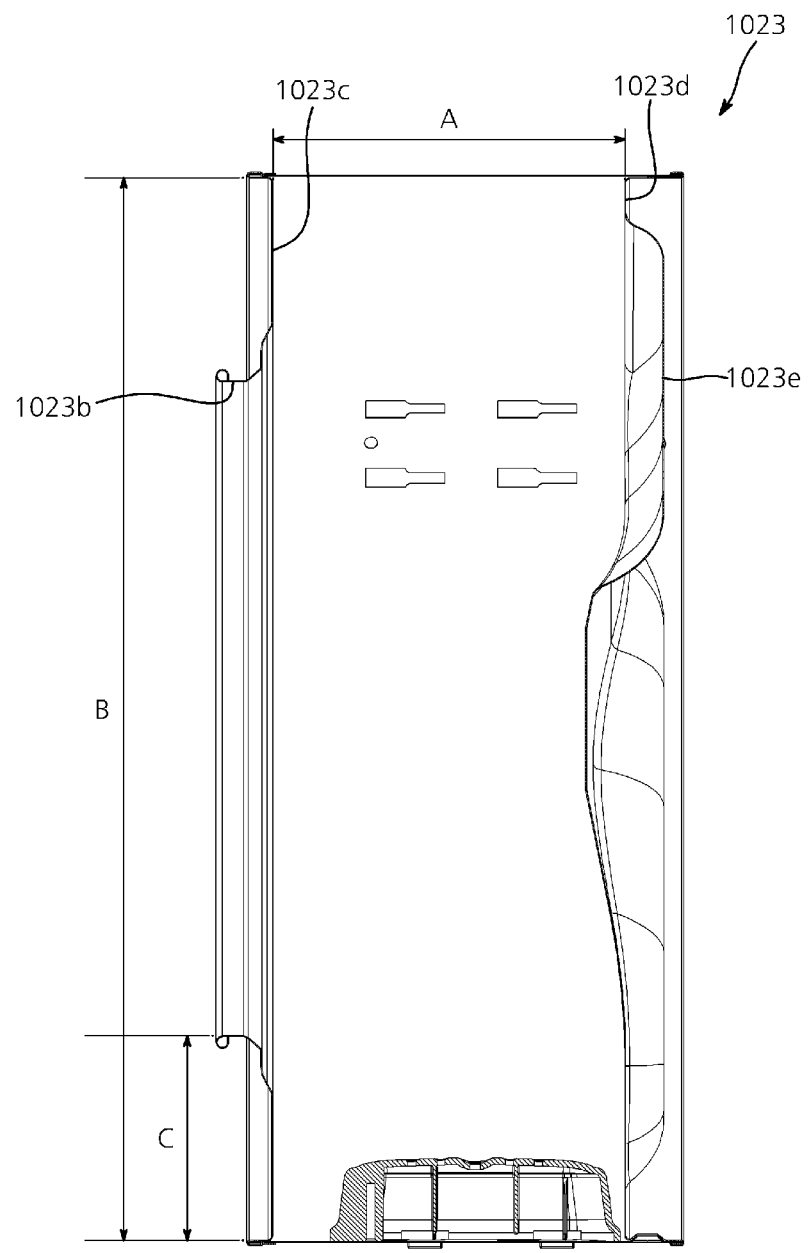

WALL-MOUNTED DRUM TYPE WASHING MACHINE

CROSS REFERENCE TO RELATED APPLICATIONS

This application claims priority to and is a continuation application U.S. patent application Ser. No. 14/119,434, filed on Nov. 21, 2013, entitled "WALL-MOUNTED DRUM TYPE WASHING MACHINE," which is a national phase application of the PCT patent application No. PCT/KR2012/010517, filed on Dec. 6, 2012, entitled "WALL-MOUNTED DRUM-TYPE WASHING MACHINE" and claims priority to: Korean Patent Application No. 10-2011-0131335, filed on Dec. 8, 2011; and Korean Patent Application No. 10-2012-0035171, filed on Apr. 4, 2012. The foregoing patent applications are herein incorporated by reference in entirety for all purposes.

TECHNICAL FIELD

The present invention relates to a wall-mounted drum type washing machine, and more particularly, to a wall-mounted drum type washing machine which may be installed on a wall surface and may improve the connection strength between parts of the drum type washing machine and in which the parts of the drum type washing machine may be easily manufactured.

BACKGROUND ART

In a general wall-mounted drum type washing machine, a washing drum driven by a forward/reverse motor is built in a washing tub integrated with an installation plate, and a water supply pipe and a drain pipe provided with a solenoid valve are placed in the washing tub.

The washing tub includes a water level sensor capable of sensing a water level, a hot air blower to supply hot air to the washing tub, an air blower to discharge air in the washing tub, manipulation buttons for selecting washing, spin-drying, rising, and drying operations, and a control panel to control the respective units.

The forward/reverse motor to drive the washing drum and the hot air blower to supply hot air to the washing tub are installed over the installation plate, and the water level sensor and an air discharge pipe communicating with the bottom of the washing tub and having an upper end coupled to the air blower are installed at the rear side of the installation plate.

A plurality of silicone anti-vibration rubbers each having a bolt in different sides thereof are fixed to the front side of the installation plate and coupled to anti-vibration rubber receiving grooves of an intermediate case having a washing tub insertion hole, a forward/reverse motor insertion hole, and a hot air blower insertion hole formed therein.

A ring rim having the same diameter as the washing tub is formed at the front side of the intermediate case, and the intermediate case is coupled to a front case through stay bolts. The front case is opened/closed by a door having tempered glass coupled to the inside of a frame, and has an input hole containing a silicone packing material.

A rear case having a ring formed in the upper and lower portions thereof is fixed to the front side of the intermediate case, and the ring is coupled to a bracket having an insertion piece that protrudes between the fixing pieces that are fixed to the wall.

The related art of the present invention is disclosed in Utility Model Registration Notification No. 20-0305578 published on Feb. 26, 2003 and titled "Wall-Mounted Small Drum type washing machine".

DISCLOSURE

Technical Problem

In the general wall-mounted drum type washing machine, components that support the drum are integral with the drum and/or each other, and vibrations of the drum concentrate on the connection between the components. Thus, when a washing operation is repeated over a long-term period, the connection between the components may deform or break, and subsequent vibrations and noise may increase.

Thus, there is a demand for a structure capable of solving such problems.

The present invention is conceived to solve such problems of the related art, and an aspect of the invention is to provide a wall-mounted drum type washing machine which may be installed on a wall surface and which may improve the connection strength between parts of the drum type washing machine and in which the parts of the drum type washing machine may be easily manufactured.

Technical Solution

According to an aspect of the present invention, a wall-mounted drum type washing machine includes a rear panel mounted on a wall surface; a tub containing wash water; a box unit coupled to the rear panel and surrounding the tub; and a reinforcement portion connecting the tub and the rear panel and surrounding the tub.

The rear panel may include a plurality of reinforcement ribs on a rear surface thereof.

The reinforcement portion may be integral with the reinforcement ribs.

The tub may extend from the rear panel towards the front side, and the reinforcement ribs extend from the rear panel to the rear side.

The reinforcement portion may extend from the rear panel to the front side and is integral with the tub.

The reinforcement portion may have an upper end that is curved and integral with the tub, and a space exists between the tub and the bottom of the reinforcement portion.

The rear panel may include a receiving portion in the circumference thereof and coupled to the box unit.

The receiving portion may be behind a front surface of the rear panel, and the reinforcement portion, the front surface, and the receiving portion have a stair shape.

The stair shape of the reinforcement portion, the front surface, and the receiving portion may extend to the front side from the receiving portion toward the reinforcement portion.

The rear panel may have a through-hole, through which a fastening member is inserted and coupled to the wall surface, and the fastening member is inserted into a buffer member such that the buffer member is between the through-hole and the wall surface.

A nut coupled to the fastening member may be directly attached to the front surface of the rear panel.

Advantageous Effects

In accordance with the embodiments of the present invention, since the reinforcement unit is at a connection between the rear panel and the tub, it is possible to prevent the connection between the rear panel and the tub from breaking as a result of vibrations of the drum.

Furthermore, since a space is formed between the rear panel and the tub in the wall-mounted drum type washing machine, vibrations of the drum may be suppressed from being transmitted to the tub and the rear panel. Thus, it is possible to reduce noise or vibrations which may occur during a washing operation.

Furthermore, since the connection between the rear panel and the tub has a stair shape, a mold drawing structure is simplified. Thus, it is possible to reduce the time and cost of manufacturing the integral rear panel and tub.

Since the strength of the rear panel is reinforced by the reinforcement ribs, it is possible to prevent the rear panel from being deformed or broken as a result of vibrations generated by the rotation of the drum.

Furthermore, the receiving portion is on the circumference of the rear panel and coupled to the box unit. Thus, when the box unit and the rear panel are assembled, the box unit may be received at a precise position and then assembled to the rear panel, which makes it possible to facilitate the assembling process.

Furthermore, the rear panel has a through-hole through which the fastening member is inserted and coupled to the wall surface, the fastening member is inserted into the buffer member, and the buffer member is between the through-hole and the wall surface. Thus, vibrations during the washing process may be suppressed from being transmitted to the wall surface.

Furthermore, since the nut is directly attached to the front surface of the rear panel, the connection between the nut and the fastening member, to which vibrations are transmitted, is remote from the wall surface. Thus, it is possible to more effectively block vibrations transmitted to the wall surface.

DESCRIPTION OF DRAWINGS

FIG. 51 is cross-sectional view illustrating the drum for a wall-mounted drum type washing machine in accordance with another embodiment of the present invention.

BEST MODE

Hereinafter, embodiments of the present invention will be described with reference to accompanying drawings. However, the described embodiments are for illustrative purposes only and are not intended to limit the scope of the invention.

Figure 1:
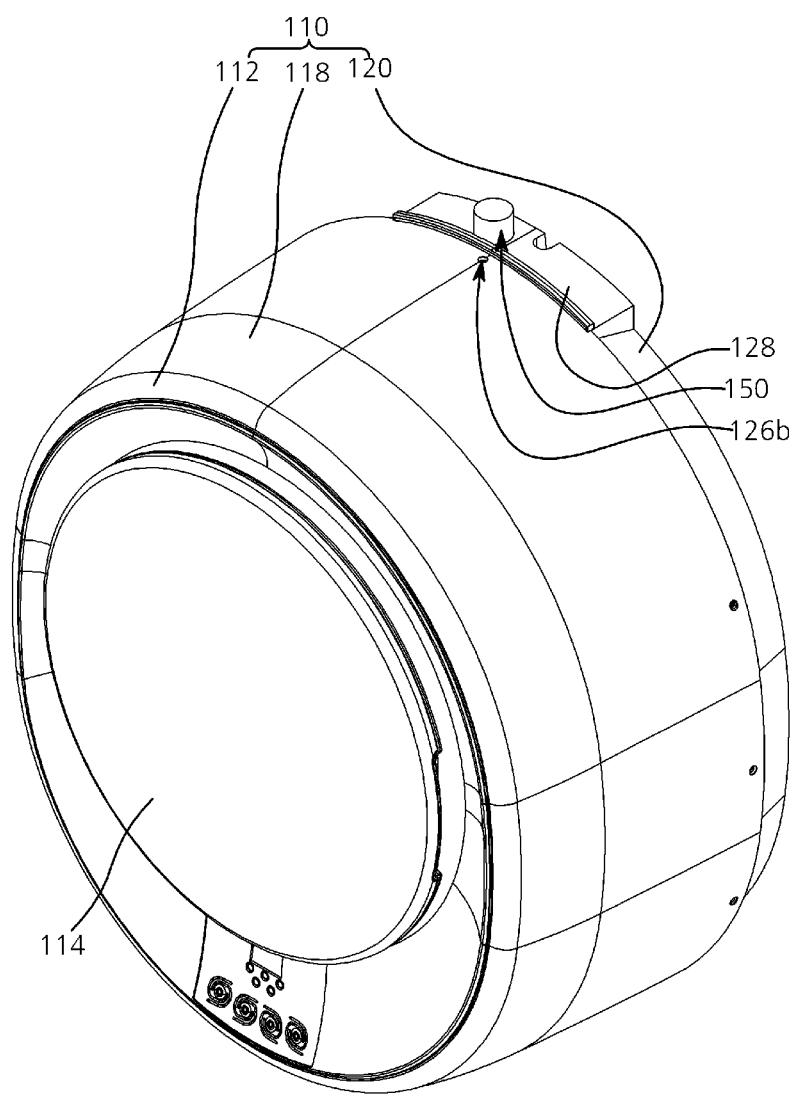
FIG. 1 is a perspective view of a wall-mounted drum type washing machine in accordance with an embodiment of the present invention.
Figure 2:
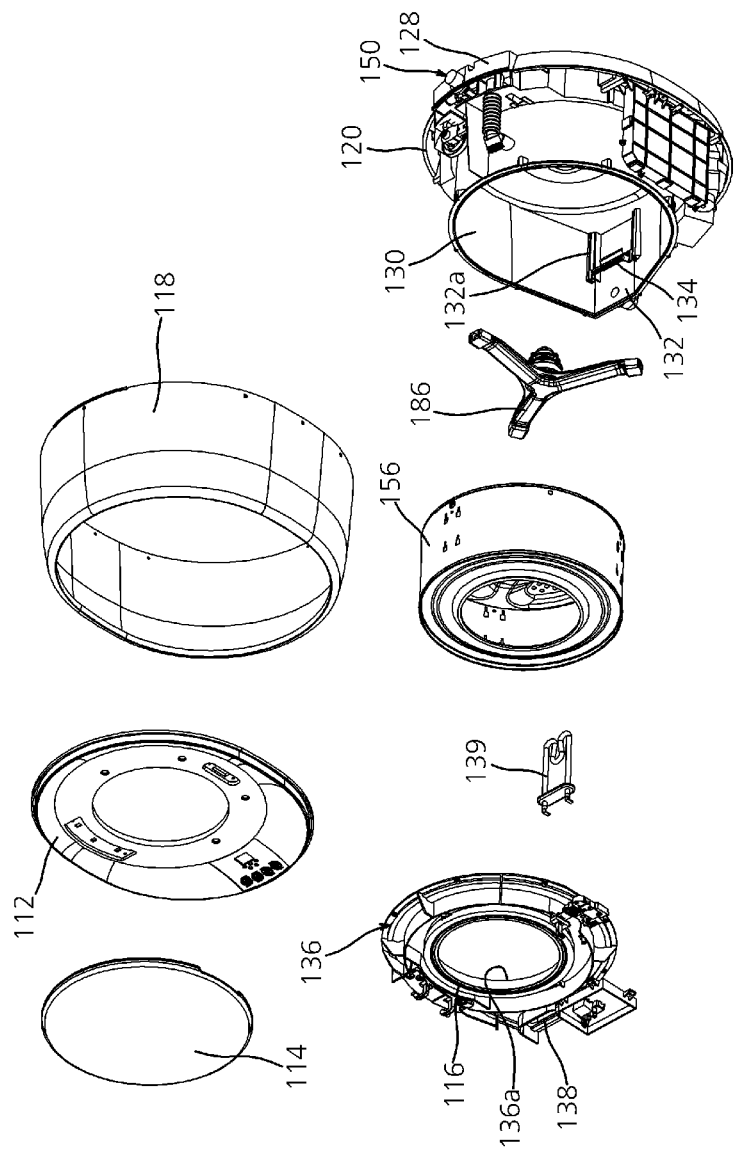
FIG. 2 is an exploded perspective view of the wall-mounted drum type washing machine in accordance with an embodiment of the present invention.
Figure 3:
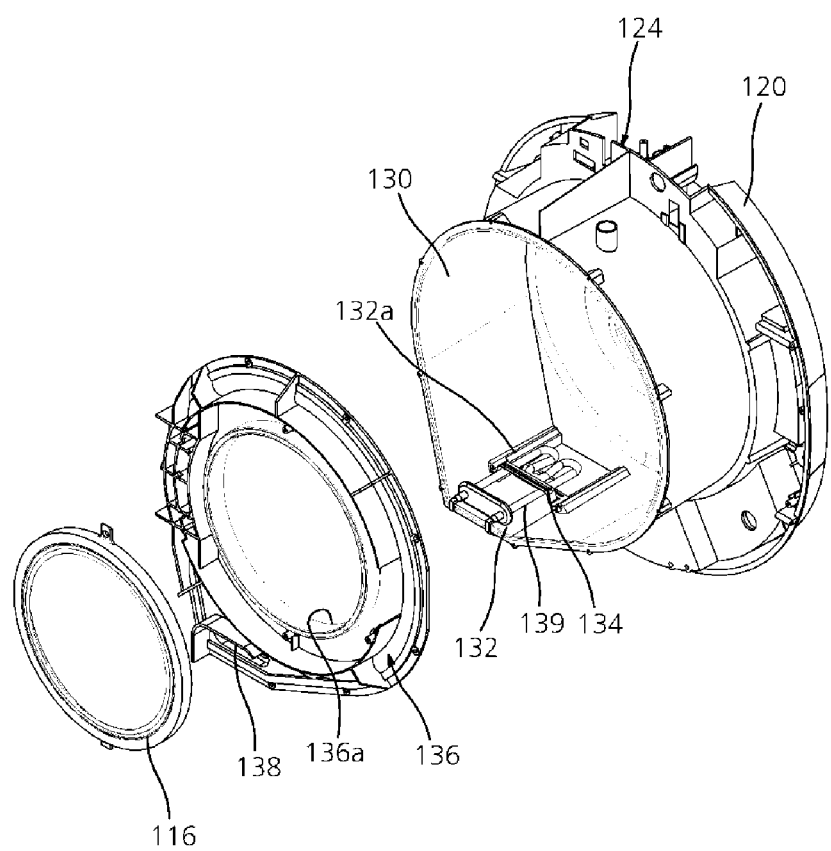
FIG. 3 is an exploded perspective view of a front panel mounting structure for a wall-mounted drum type washing machine in accordance with an embodiment of the present invention.

FIG. 1 is a perspective view of a wall-mounted drum type washing machine in accordance with an embodiment of the present invention. FIG. 2 is an exploded perspective view of the wall-mounted drum type washing machine in accordance with an embodiment of the present invention. FIG. 3 is an exploded perspective view of a front panel mounting structure for the wall-mounted drum type washing machine in accordance with an embodiment of the present invention.

Figure 4:
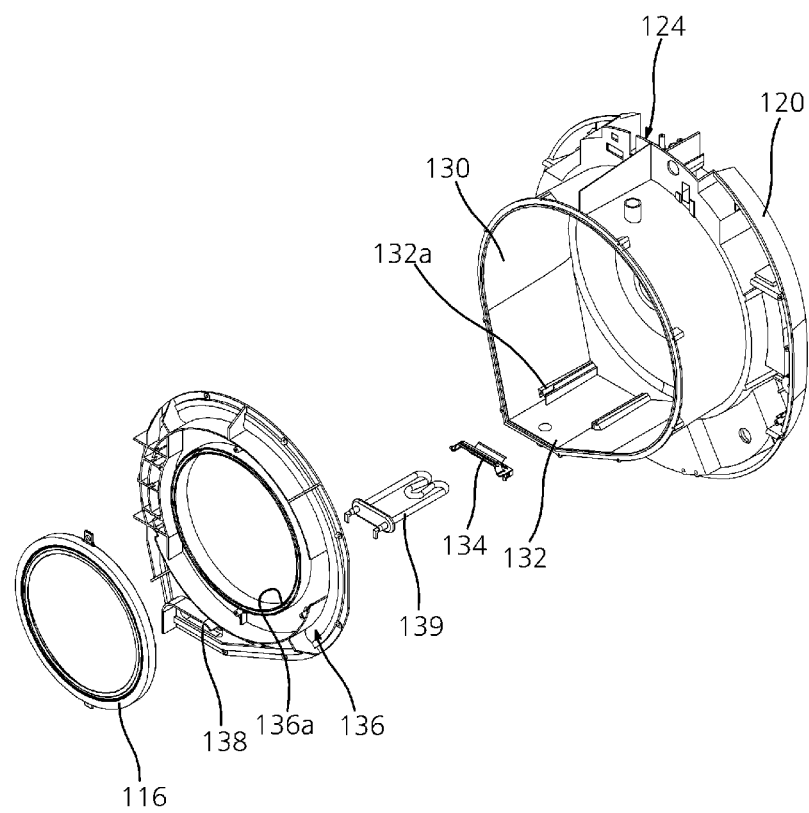
FIG. 4 is an exploded perspective view of a gasket and heater mounting structure for a wall-mounted drum type washing machine in accordance with an embodiment of the present invention.
Figure 5:
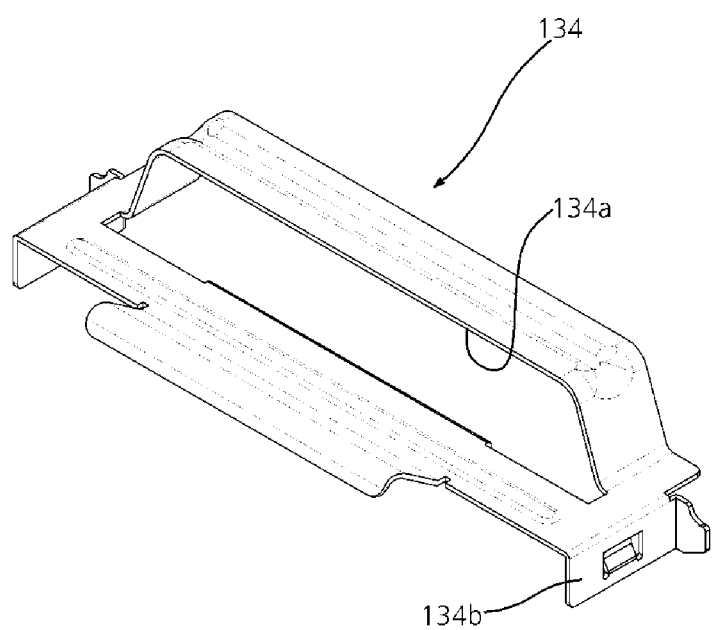
FIG. 5 is a perspective view of a bracket for a wall-mounted drum type washing machine in accordance with an embodiment of the present invention.
Figure 6:
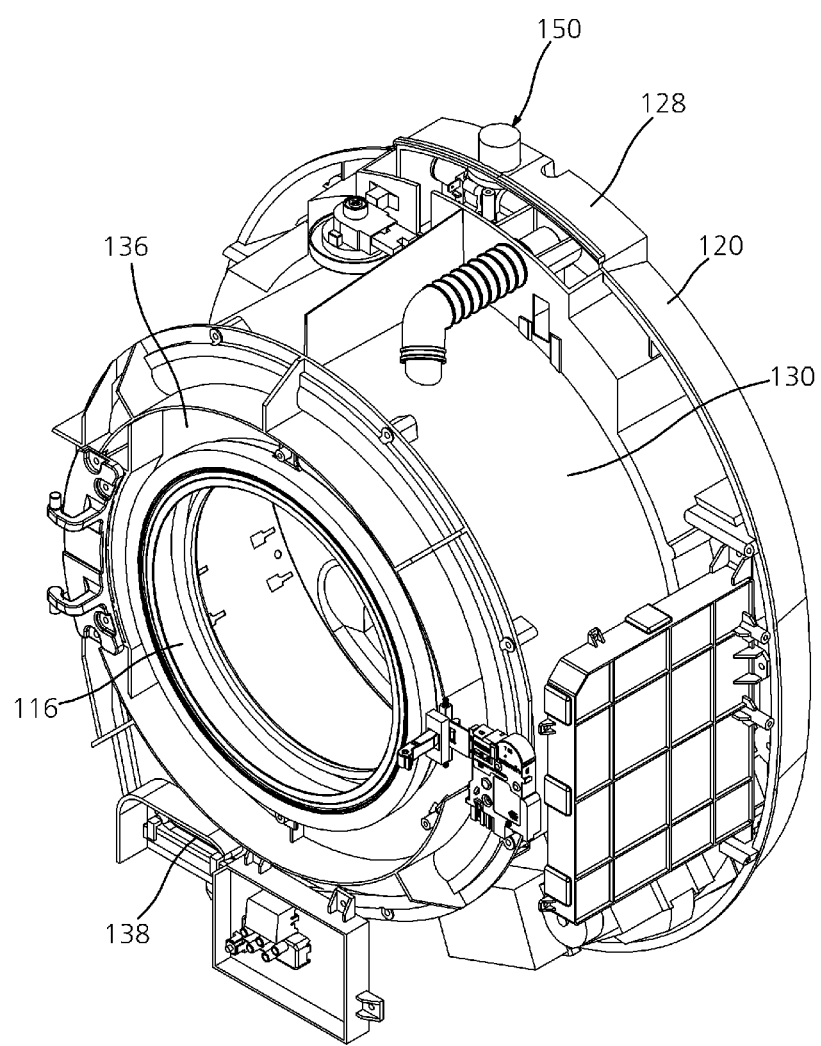
FIG. 6 is a perspective view illustrating a tub, a front panel, and the gasket mounting structure for a wall-mounted drum type washing machine in accordance with an embodiment of the present invention.

FIG. 4 is an exploded perspective view of a gasket and heater mounting structure for the wall-mounted drum type washing machine in accordance with an embodiment of the present invention. FIG. 5 is a perspective view of a bracket for the wall-mounted drum type washing machine in accordance with an embodiment of the present invention. FIG. 6 is a perspective view illustrating a tub, a front panel, and the gasket mounting structure for the wall-mounted drum type washing machine in accordance with an embodiment of the present invention.

Figure 7:
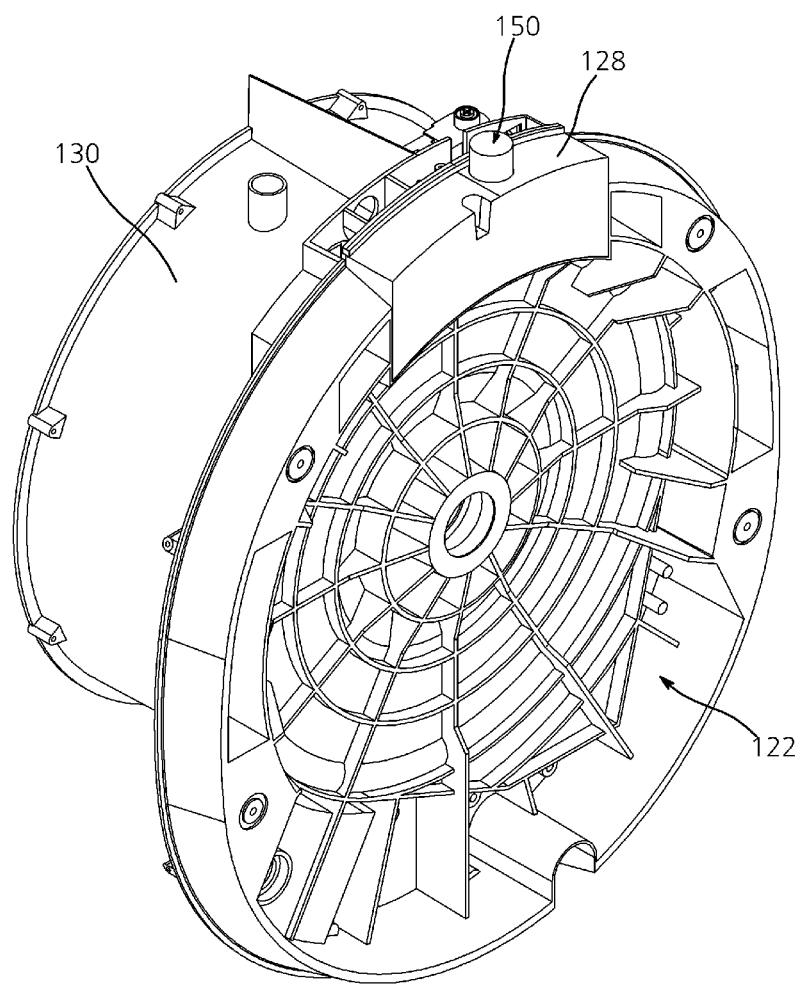
FIG. 7 is a rear perspective view of the tub for the wall-mounted drum type washing machine in accordance with an embodiment of the present invention.
Figure 8:
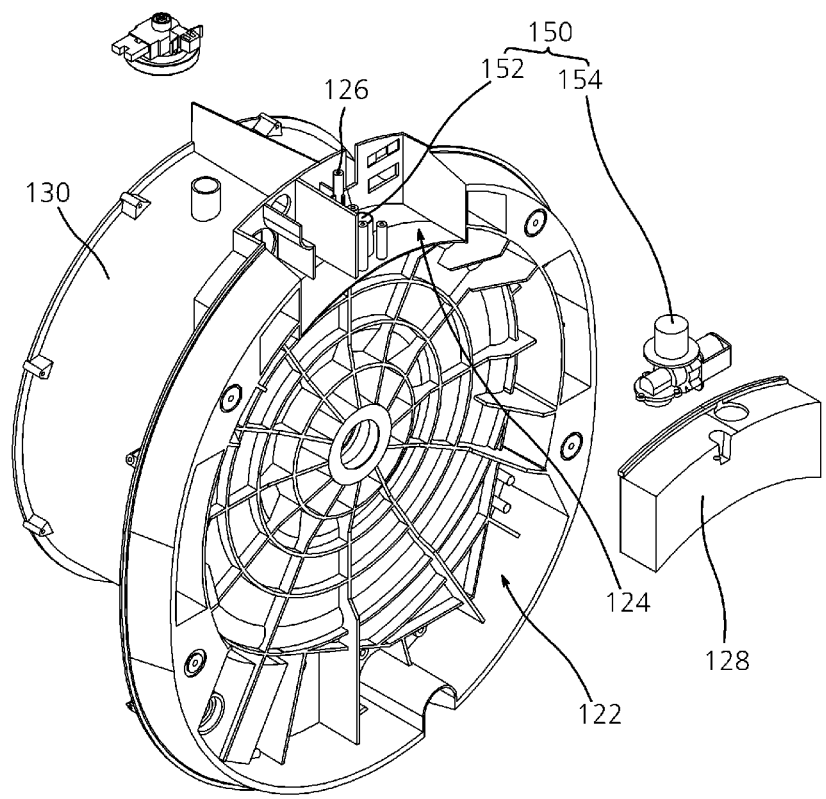
FIG. 8 is an exploded perspective view of a water supply device for a wall-mounted drum type washing machine in accordance with an embodiment of the present invention.
Figure 9:
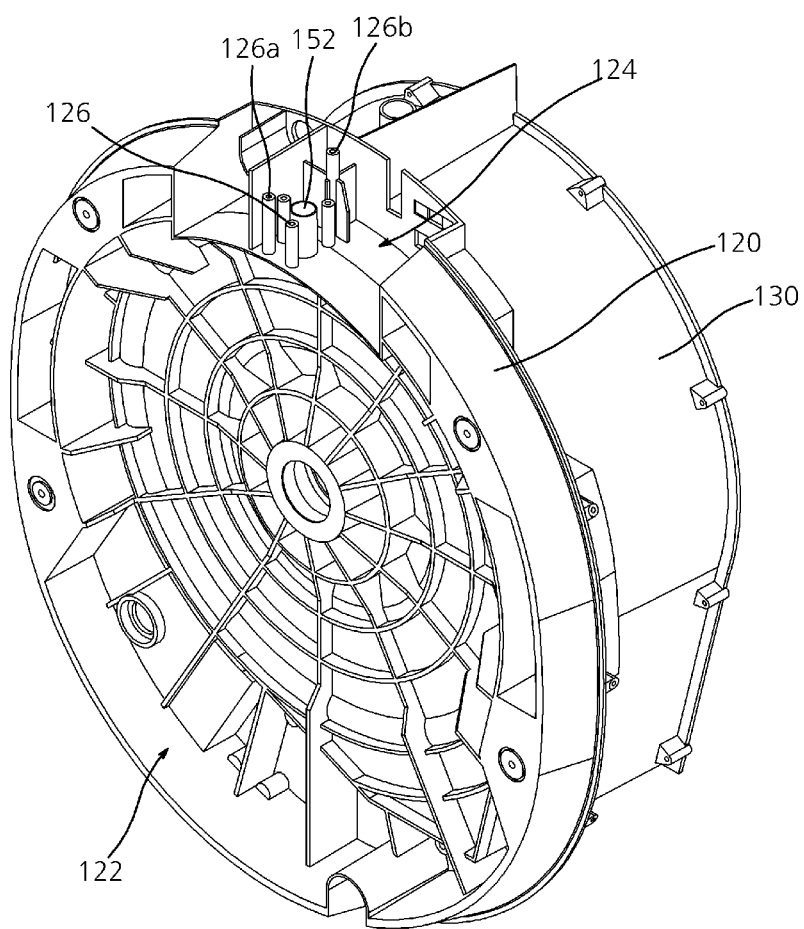
FIG. 9 is a rear perspective view of a connection portion for a wall-mounted drum type washing machine in accordance with an embodiment of the present invention.

FIG. 7 is a rear perspective view of the tub for the wall-mounted drum type washing machine in accordance with an embodiment of the present invention. FIG. 8 is an exploded perspective view of a water supply device for the wall-mounted drum type washing machine in accordance with an embodiment of the present invention. FIG. 9 is a rear perspective view of a connection portion for the wall-mounted drum type washing machine in accordance with an embodiment of the present invention.

Figure 10:
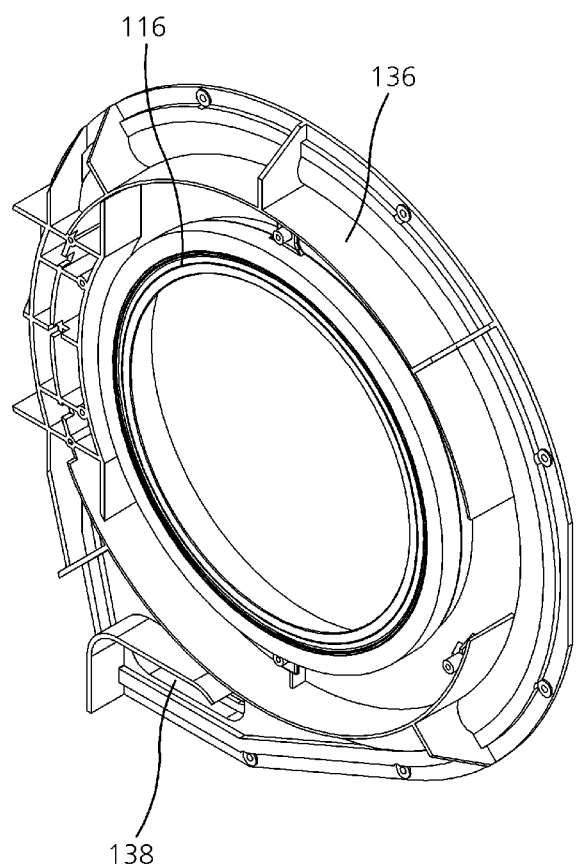
FIG. 10 is a perspective view of the front panel for a wall-mounted drum type washing machine in accordance with an embodiment of the present invention.
Figure 11:
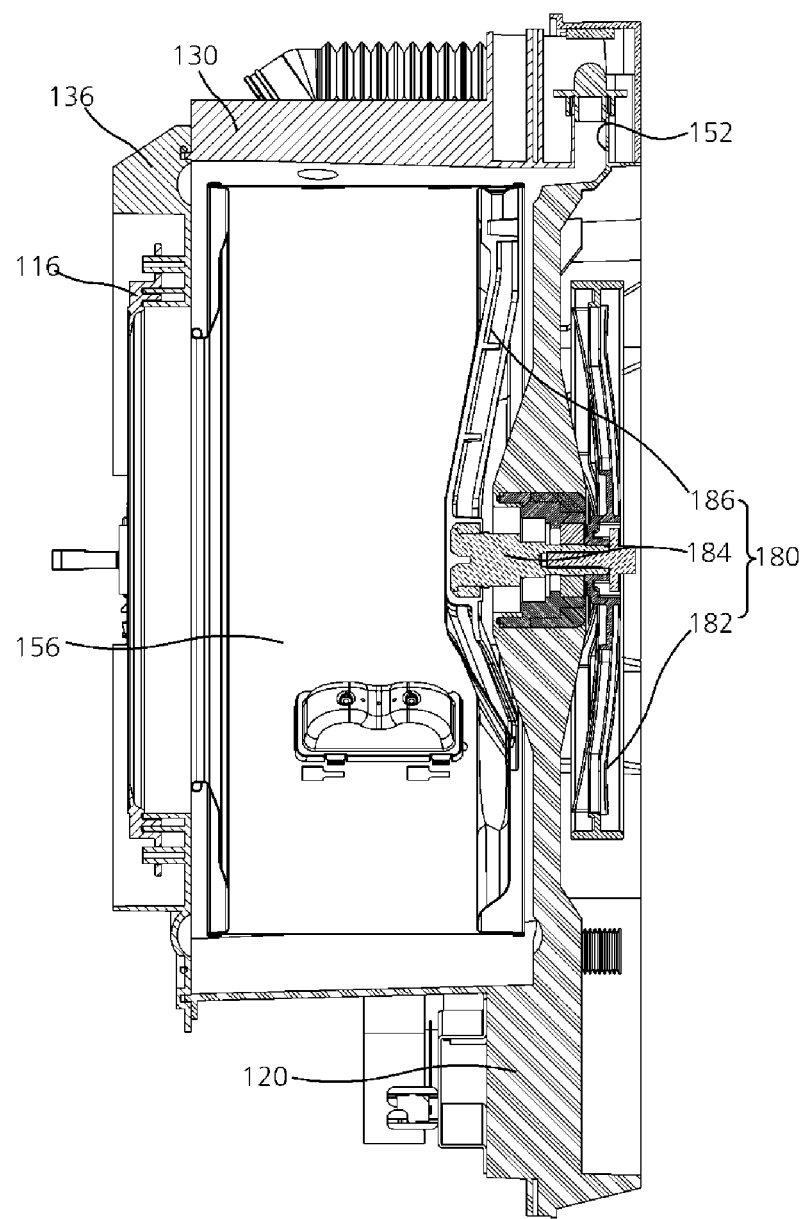
FIG. 11 is a cross-sectional view of the tub, the front panel, and the gasket mounting structure for a wall-mounted drum type washing machine in accordance with an embodiment of the present invention.
Figure 12:
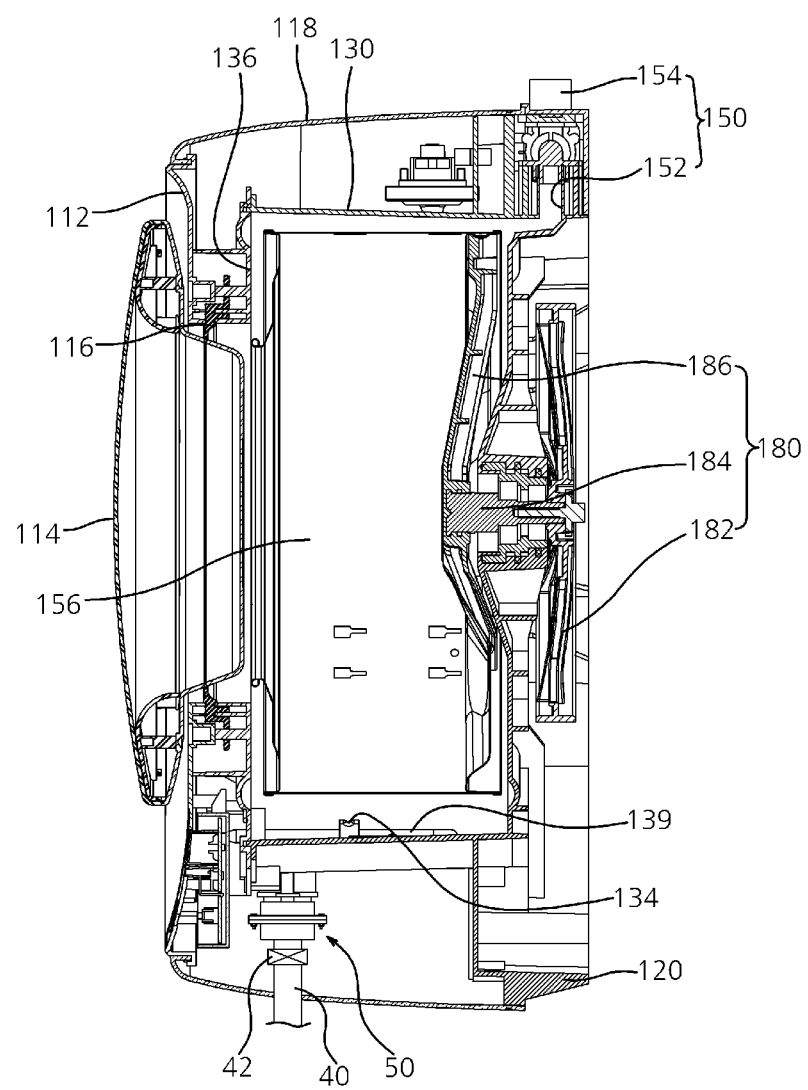
FIG. 12 is a cross-sectional view of the wall-mounted drum type washing machine in accordance with an embodiment of the present invention.

FIG. 10 is a perspective view of the front panel for the wall-mounted drum type washing machine in accordance with an embodiment of the present invention. FIG. 11 is a cross-sectional view of the tub, the front panel, and the gasket mounting structure for the wall-mounted drum type washing machine in accordance with an embodiment of the present invention. FIG. 12 is a cross-sectional view of the wall-mounted drum type washing machine in accordance with an embodiment of the present invention.

Referring to FIGS. 1 to 12, the wall-mounted drum type washing machine in accordance with embodiments of the present invention includes a cabinet 110, a tub 130, a drum 156, a water supply device 150, and a drain device 30, 40, and 50. The tub 130 is in the cabinet 110 and is configured to contain water. The drum 156 is rotatable and installed inside the tub 130. The water supply device 150 serves to supply wash water into the tub 130 through the top surface of the cabinet 110. The drain device 30, 40, and 50 serves to discharge the wash water in the tub 130 to the outside.

When a washing operation is started after laundry is put into the drum 156, wash water is supplied to the tub 130 by the water supply device 150.

In accordance with an embodiment of the present invention, the water supply device 150 is at the top surface of the cabinet 110. Therefore, the wash water is supplied to the tub 130 through the top surface of the cabinet 110.

In the conventional wall-mounted drum type washing machine, the water supply device is connected to the rear surface of the cabinet. In this example of the present invention, however, since the water supply device 150 is connected to the top surface of the cabinet 110, the cabinet 110 may be installed such that the rear surface thereof is attached directly to a wall surface W. Accordingly, the wall-mounted drum type washing machine may be easily implemented.

Referring to FIGS. 7 to 9, 11, and 12, the water supply device 150 includes a water supply pipe 152 connected between the top surface of the cabinet 110 and the rear surface of the tub 130.

The water supply pipe 152 protrudes upward from the top surface of the cabinet 110. Therefore, when a water supply hose is connected to the water supply pipe 152, wash water is supplied into the cabinet 110 through the water supply pipe 152. The wash water supplied into the cabinet 110 is supplied into the tub 130 through the rear side of the tub 130.

The wash water supplied along the water supply pipe 152 flows onto the outer wall of the drum 156 from the rear side to the front side of the drum 156, and then is supplied into the drum 156 through a plurality of holes in the wall of the drum 156.

Since the wash water flowing to the outer wall of the drum 156 washes off foreign matter remaining on the outer wall of the drum 156, it is possible to prevent foreign matter such as detergent or lint from remaining on the outer wall of the drum 156.

Furthermore, since the wash water flowing to the outer wall of the drum 156 is supplied into the drum 156 through the holes formed in the outer wall of the drum 156, the wash water may be uniformly supplied to the entire laundry housed in the drum 156, which makes it possible to increase wetting efficiency.

Since the wash water is supplied to the drum 156 while flowing from the rear side to the front side of the tub 130, all of the laundry housed in the drum 156 may be uniformly wetted at the initial stage of the washing operation. Therefore, as wetting is uniformly performed, it is possible to improve the washing efficiency.

Referring to FIGS. 1 and 2, the cabinet 110 includes a rear panel 120, a box unit 118, and a cover unit 112. The rear panel 120 is mounted on the wall surface W and integral with the tub 130. The box unit 118 is detachably coupled to the rear panel 120 and is configured to surround the tub 130. The cover unit 112 is on the box unit 118 and has a door 114 provided thereon.

The rear panel 120 is coupled to the wall surface W using a coupling member 190, and is integral with the tub 130.

Since the rear panel 120 mounted on the wall surface W is integral with the tub 130, a separate damper or damping spring is not required to support the tub 130, unlike the conventional wall-mounted washing machine. Therefore, the number of parts and the size of the wall-mounted drum type washing machine may be reduced.

Here, the rear panel 120 serves as a support member for supporting the tub 130 and a mounting member for mounting the cabinet 110 on the wall surface W. Therefore, the structure of the cabinet 110 is simplified, and the support structure of the tub 130 is simplified.

The rear panel 120 has a front side having a circular shape, and the cylindrical tub 130 is integral with the front surface of the rear panel 120. The front shape of the rear panel 120 may have another shape, instead of a circular shape.

The tub 130 has a cylindrical shape, of which the diameter gradually increases toward the door 114. Accordingly, the wash water supplied into the tub 130 flows toward the front side of the tub 130 from the rear side of the tub 130.

Referring to FIG. 12, a siphon drain unit 50 is connected to the front portion of the tub 130, and the wash water remaining in the tub 130 flows toward the front side of the tub 130 along an inclined surface along the inner wall of the tub 130. Then, since the wash water that collects at the front side of the tub 130 is discharged to the outside through the siphon drain unit 50, it is possible to prevent the wash water from remaining in the tub 130.

The box unit 118 has a cylindrical shape of which front and rear surfaces are opened. The box unit 118 has a larger diameter than the tub 130 and surrounds the circumferential surface of the tub 130. The rear end portion of the box unit 118 is detachably coupled to the rear panel 120 using a screw or the like. That is, the tub 130 is surrounded by the box unit 118 when the box unit 118 is coupled to the rear panel 120.

The cover unit 112 is at the front opening of the box unit 118. The cover unit 112 has a circular panel shape, that is, a circular planar shape, and includes an opening in the central portion thereof. The opening is opened and/or closed by the door 114 attached to the cover unit 112.

The tub 130 includes a front panel 136 having a housing hole 136a therein, and the box unit 118 is coupled to the rear panel 120 and surrounds the tub 130. The cover unit 112 is at the front side of the box unit 118 and covers the front panel 136.

As such, the front panel 136 is surrounded by the cover unit 112, the cover unit 112 is reliably fixed while elastically coupled to the box unit 118, and the box unit 118 is coupled to the rear panel 120 mounted on the wall surface W using a coupling member or the like. Therefore, it is possible to support the tub 130 while reducing vibrations from the front portion of the tub 130, without a damper or damping spring to support the front portion of the tub 130.

As described above, since the wall-mounted drum type washing machine is not placed on the ground but installed or mounted on the wall, the exterior shape of the wall-mounted drum type washing machine is not limited to a hexahedral shape, but may be changed to various other shapes. In the present invention, the cabinet 110 forming the exterior shape of the wall-mounted drum type washing machine having a circular shape is merely an example.

Figure 18:
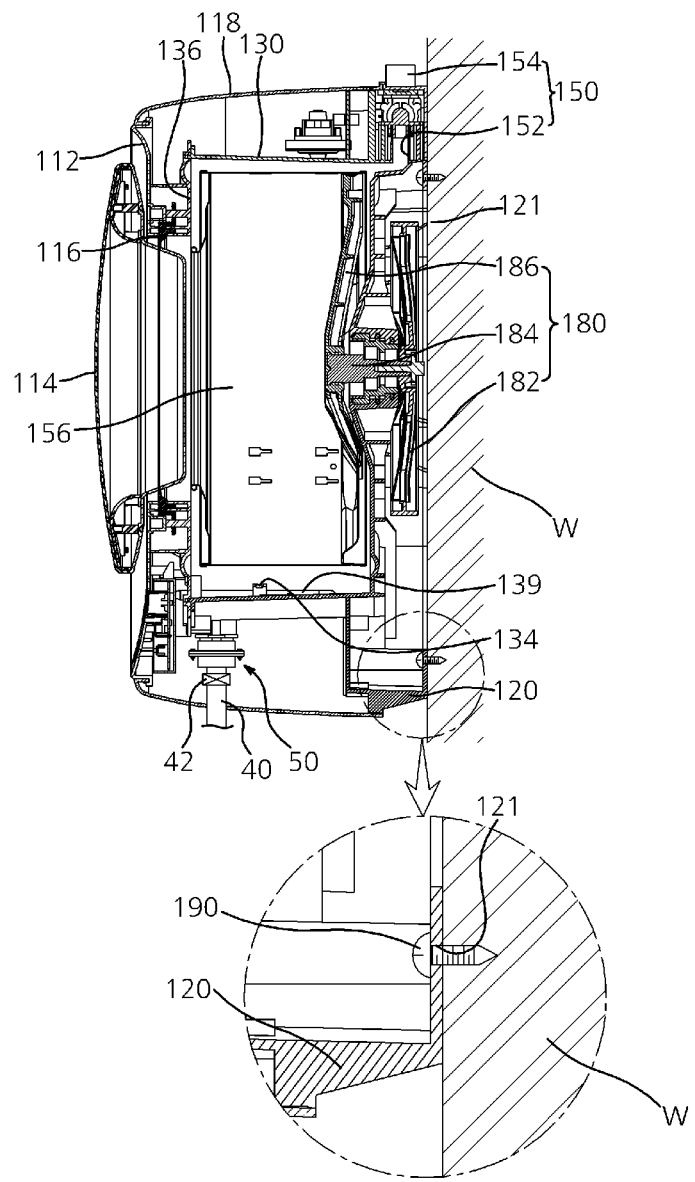
FIG. 18 is a diagram illustrating an example in which the wall-mounted drum type washing machine in accordance with an embodiment of the present invention is installed on the wall surface.

Referring to FIGS. 3, 6, and 18, the tub 130 is integrally formed with the rear panel 120 using injection molding or the like. Furthermore, the rear panel 120 is reliably mounted on the wall surface W using a coupling member 190. Since the tub 130 is integrally formed with the rear panel 120 which is directly coupled and fixed to the wall surface W, a damper or damping spring for damping vibrations may be omitted.

Furthermore, since the drum 156 in accordance with an embodiment of the present invention may have a small capacity to house and wash a small amount of laundry, vibrations from rotation of the drum 156 may be sufficiently offset by the coupling force from mounting the rear panel 120 on the wall surface W with the coupling members 190.

Accordingly, it is possible to not only suppress vibrations and noise occurring during the washing operations of the wall-mounted drum type washing machine, but also to omit a damper or damping spring for reducing vibrations and noise as is used in the conventional wall-mounted drum type washing machine. Therefore, the weight of the present wall-mounted drum type washing machine may be reduced.

Referring to FIGS. 7 and 8, the rear panel 120 has a mounting groove 122 that forms a space between the wall surface W and the rear panel 120. The mounting groove 122 is concave toward the front side from the rear-side circumference of the rear panel 120.

Accordingly, a driving unit 180 may be located in the space formed by the mounting groove 122 between the wall surface W and the rear surface of the rear panel 120. Therefore, since the driving unit 180 does not need a separate space to be secured to the rear panel, the distance of the front surface of the wall-mounted drum type washing machine from the wall surface W may be reduced. As a result, it is possible to reduce the size of the wall-mounted drum type washing machine.

Referring to FIG. 9, the water supply pipe 152 protrudes upward from the top surface of the cabinet 110. Specifically, the water supply pipe 152 is in a connection portion 124 in the circumference of the mounting groove 122, on the top surface of the rear panel 120, and does not interfere with the box unit 118.

Therefore, when the water supply device 150 is to be replaced or repaired, the water supply device 150 may be replaced or repaired when the box unit 118 is not removed from the rear panel 120.

Referring to FIGS. 8 and 12, a water supply valve 154 is on the connection portion 124 and connected to the water supply pipe 152, and a cover 128 is detachably mounted on the connection portion 124 to cover the water supply pipe 152 and the water supply valve 154. Accordingly, when the cover 128 is removed from the connection portion 124, the operation of replacing or repairing the water supply pipe 152 or the water supply valve 154 may be immediately performed.

In addition to the water supply pipe 152, a plurality of coupling holes 126 having a pillar shape are on the top surface of the rear panel 120. One or more of the coupling holes 126 serves to fix the water supply valve 154 to the connection portion 124 using a screw or the like.

The cover 128 is coupled to any one coupling hole 126a of the coupling holes 126 using a screw or the like. The box unit 118 is reliably coupled to the rear panel 120 and coupled to any one coupling hole 126b of the coupling holes 126 using a screw or the like.

When the screw or the like coupled to the coupling hole 126 is removed, the cover 128 may be removed from the connection portion 124. Furthermore, the water supply valve 154 exposed to the outside by the removal of the cover 128 may be easily separated from the water supply pipe 152.

When the water supply valve 154 is broken, the water supply valve 154 may be immediately replaced by removing the cover 128 from the connection portion 124 when the box unit 118 is not removed from the rear panel 120.

The rear panel 120 and the tub 130 comprise a synthetic resin material. Furthermore, since the rear panel 120 and the tub 130 are manufactured by injection molding, the tub 130 and the rear panel 120 may be simultaneously manufactured by one injection molding operation, and the tub 130 and the rear panel 120 are integrated by injection molding. Accordingly, it is possible to reduce the time and cost for manufacturing the tub 130 and the rear panel 120.

Referring to FIGS. 2, 7, and 12, the driving unit 180 that provides power to the drum 156 is at the rear side of the rear panel 120.

The driving unit 180 includes a motor 182, a rotating shaft 184, and a support 186. The motor 182 is at the rear side of the rear panel 120, or specifically, in the mounting groove 122. The rotating shaft 184 transmits power from the motor 182, and extends through the real panel 120. The support 186 connects the rotating shaft 184 and the drum 156.

The support 186 has a tripod shape and is connected or directly attached to the outer wall of the rear surface of the drum 156. The rotating shaft 184 is coupled to the center of the support 186 so that the power of the motor 182 is transmitted to the drum 156 through the rotating shaft 184 and the support 186.

Referring to FIGS. 3 to 5, the tub 130 includes a receiving groove 132 having a heater 139 therein, and a slidable bracket 134 configured to support the heater 139 is coupled to or inserted into the receiving groove 132.

The receiving groove 132 is a flat or concave part of the bottom of the tub 130 in a side direction. The receiving groove 132 includes a pair of rails 132a into which the bracket 134 can be slidably inserted.

The bracket 134 includes a pair of protrusions 134b and an insertion hole 134a. The pair of protrusions 134b are slid along the rails 132a. The insertion hole 134a is formed between the pair of protrusions 134b, and one end portion of the heater 139 is inserted into the insertion hole portion 134a.

Referring to FIGS. 2 to 4, the front panel 136 is installed at the front of the tub 130, and has a connection hole 138 therein to support the heater 139. Therefore, when the heater 139 is inserted through the connection hole 138 and the front panel 136 is on the tub 130, one end of the heater 139 is supported by the insertion hole 134a, and the other end of the heater 139 is supported by the connection hole 138.

Accordingly, when the heater 139 is repaired or replaced, an operator may remove the heater 139 through the connection hole portion 138, without removing the front panel 136 from the tub 130.

The cover unit 112 having the door 114 mounted thereon is installed on the box unit 118, and the gasket 116 is in the housing hole 136a of the front panel 136 facing the door 114.

Figure 13:
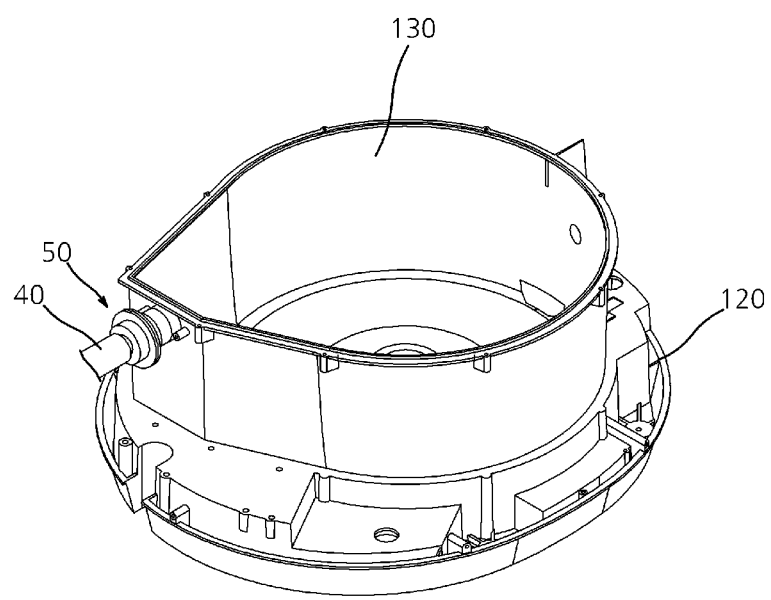
FIG. 13 is a perspective view of a drain device mounting structure for a wall-mounted drum type washing machine in accordance with an embodiment of the present invention.
Figure 14:
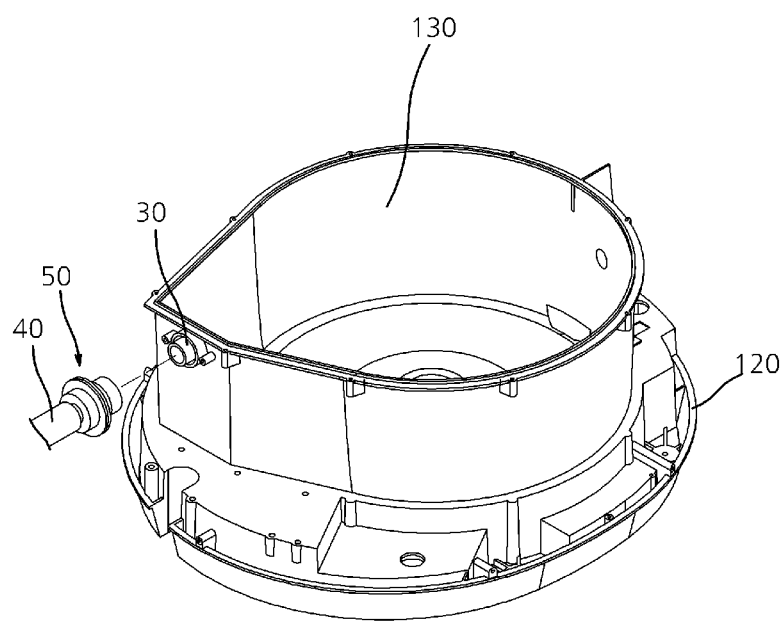
FIG. 14 is an exploded perspective view of the drain device mounting structure for a wall-mounted drum type washing machine in accordance with an embodiment of the present invention.
Figure 15:
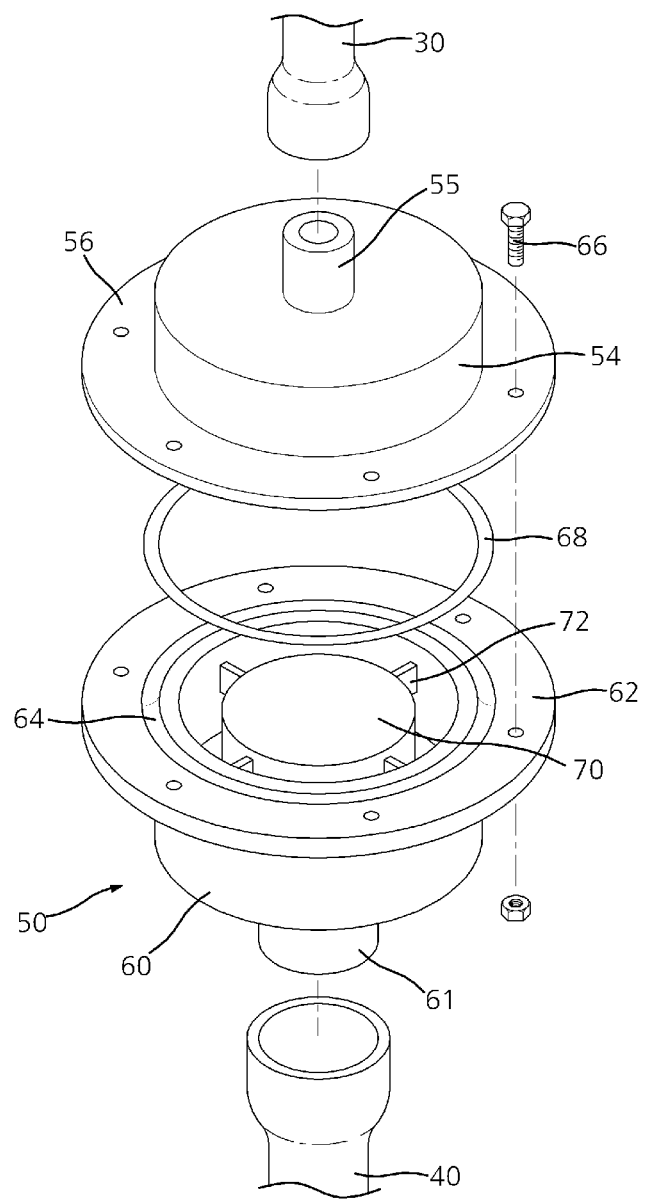
FIG. 15 is an exploded perspective view of the drain device for a wall-mounted drum type washing machine in accordance with an embodiment of the present invention.

FIG. 13 is a perspective view of a drain device mounting structure for a wall-mounted drum type washing machine in accordance with an embodiment of the present invention. FIG. 14 is an exploded perspective view of the drain device mounting structure for the wall-mounted drum type washing machine in accordance with an embodiment of the present invention. FIG. 15 is an exploded perspective view of the drain device for the wall-mounted drum type washing machine in accordance with an embodiment of the present invention.

Figure 16:
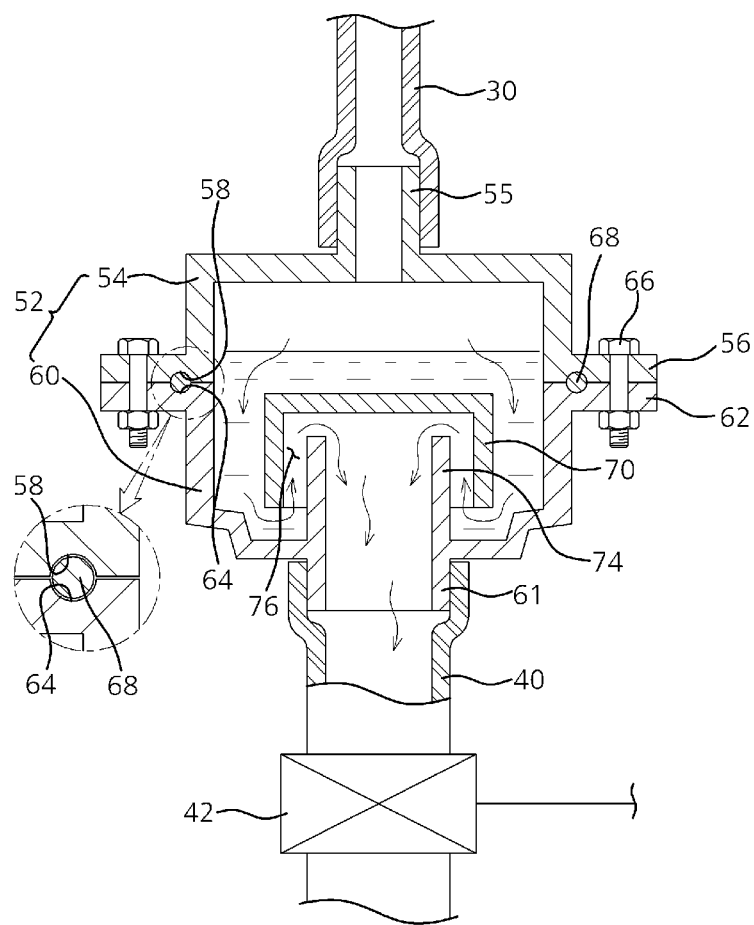
FIG. 16 is a side cross-sectional view illustrating an assembled drain device for a wall-mounted drum type washing machine in accordance with an embodiment of the present invention is assembled.
Figure 17:
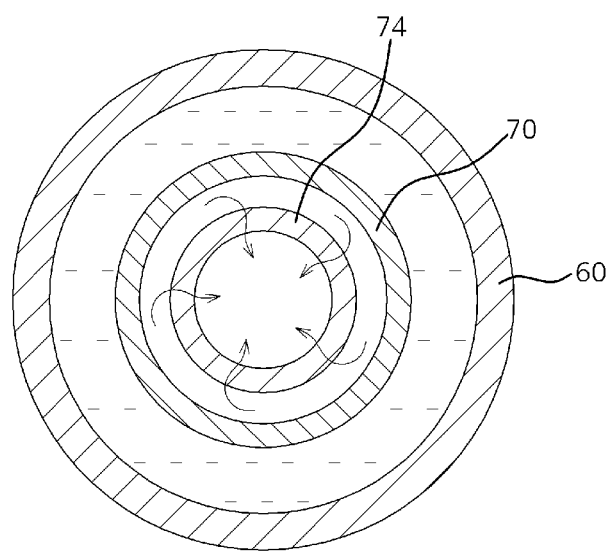
FIG. 17 is a plan cross-sectional view of the drain device in accordance with an embodiment of the present invention.

FIG. 16 is a side cross-sectional view illustrating an assembled drain device for a wall-mounted drum type washing machine in accordance with an embodiment of the present invention. FIG. 17 is a plan cross-sectional view of the drain device in accordance with an embodiment of the present invention.

Referring to FIGS. 13 to 17, the drain device 30, 40, and 50 is at the bottom of the tub 130 to discharge wash water at the bottom of the drum 156. The drain device 30, 40, and 50 in accordance with an embodiment of the present invention includes a first drain pipe 30, a second drain pipe 40, and a siphon drain unit 50.

The first drain pipe 30 is at the bottom of the tub 130. The wash water supplied to the drum 156 is discharged to the outside of the cabinet 110 through the first drain pipe 30 after the washing operation is performed.

The second drain pipe 40 is under the first drain pipe 30, and has a larger diameter than the first drain pipe 30. The second drain pipe 40 is connected to the first drain pipe 30 through the siphon drain unit 50.

The second drain pipe 40 includes a drain valve 42 to control the discharge amount of wash water. The drain valve 42 may include a solenoid valve. The first and second drain pipes 30 and 40 have central lines that vertically coincide with each other.

The siphon drain unit 50 is between the first and second drain pipes 30 and 40. The siphon drain unit 50 applies siphon pressure to water in the first drain pipe 30 using wash water discharged from the second drain pipe 40, thereby promoting the discharge of the wash water.

The siphon drain unit 50 includes a body 52, a drain induction member 70, and a siphon induction pipe 74.

The body 52 includes an inlet 55 connected to the first drain pipe 30 and an outlet 61 connected to the second drain pipe 40, and has an internal space to store wash water.

Specifically, the body 52 is divided into a first body 54, a second body 60, and a fixing member 66. The first body 54 includes an inlet 55 and a first flange 56 on the lower circumference thereof. The second body 60 includes the outlet 61 and a second flange 62 contacting the first flange 56. The fixing member 66 serves to couple the first and second flanges 56 and 62.

Furthermore, an O-ring 68 for sealing may be provided on corresponding inner surfaces of the first and second flanges 56 and 62. The O-ring 68 may have a circular or polygonal cross-section. In this embodiment of the present invention, the O-ring 68 has a circular cross-section.

The O-ring 68 is in a first receiving groove 58 in the first flange 56 and a second receiving groove 64 in the second flange 62. The first and second receiving grooves 58 and 64 face each other.

The fixing member 66 includes a bolt inserted into holes in the first and second flanges 56 and 62, respectively, and a nut coupled to the bolt. If necessary, another fixing member such as a screw may be used.

The drain induction member 70 having a cap shape is in the body 52, and has a space therein. The drain induction member 70 is supported by a plurality of support members 72 between an inner surface of the body 52 and an outer surface of the drain induction member 70.

The lower circumferential surface of the drain induction member 70 is a predetermined distance from the bottom surface of the second body 60. This structure may be implemented by connecting the outer surface of the drain induction member 70 and the inner surface of the second body 52 using the support members 72.

The siphon induction pipe 74 is fixed to the body 52 such that wash water rises and is then discharged through the outlet 61. The inner wall of the drain induction member 70 is separate from the outer wall of the siphon induction pipe 74, and the wash water rises through a flow path 76 in the space between the inner wall of the drain induction member 70 and the outer wall of the siphon induction pipe 74.

The siphon induction pipe 74 extends upward from the bottom surface of the body 52, and is connected to the outlet 61, and has an inner diameter equal to that of the outlet 61. The outlet 61 has an inner diameter equal to that of the second drain pipe 40.

The drain induction member 70 surrounds the upper portion of the siphon induction pipe 74 protruding upward from the bottom of the body 52, and the gap between the inner wall of the drain induction member 70 and the outer wall of the siphon induction member 74 serves as the flow path 76.

Therefore, wash water introduced to the body 52 through the first drain pipe 30 strikes the drain induction member 70 and then moves toward the outer edge of the drain induction member 70 (that is, the inner wall of the body 52). Then, the wash water drops toward the bottom of the body 52, rises along the flow path 76 between the drain induction member 70 and the siphon induction pipe 74, and then flows through the outlet 61 via the siphon induction pipe 74.

Since the drain process is delayed while the wash water flows along the above-described path, siphon pressure is applied to the first drain pipe 30.

Figure 19:
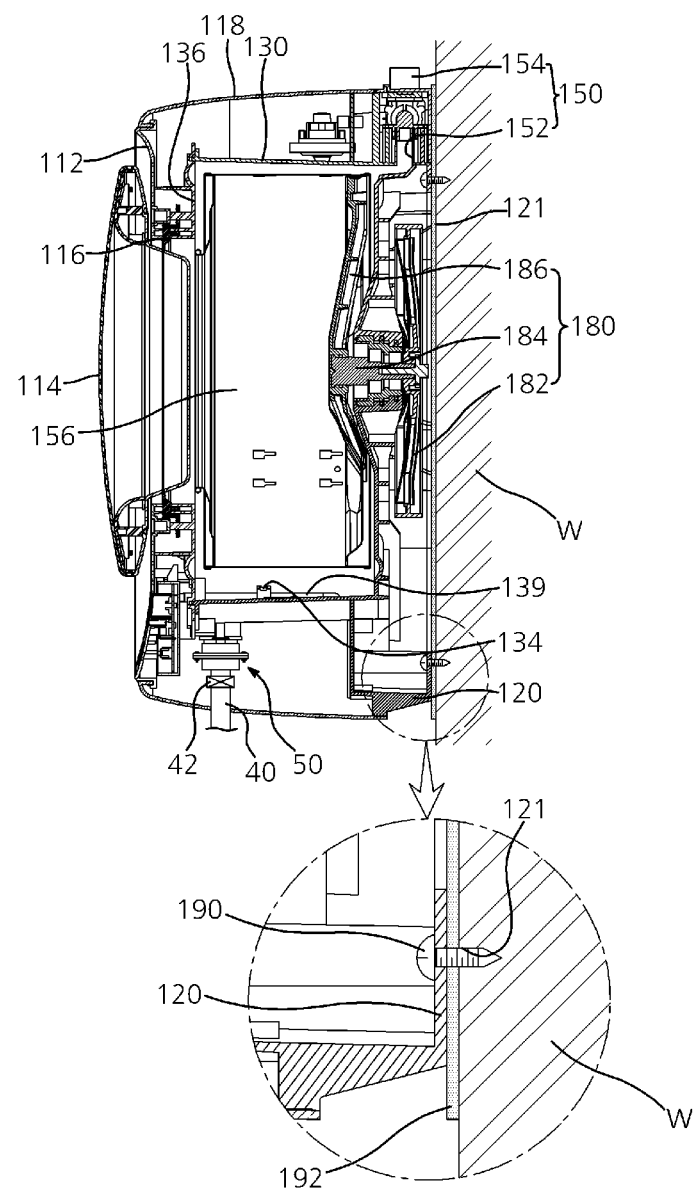
FIG. 19 is a diagram illustrating a modified example in which the wall-mounted drum type washing machine in accordance with an embodiment of the present invention is installed on the wall surface.

FIG. 18 is a diagram illustrating an example in which the wall-mounted drum type washing machine in accordance with an embodiment of the present invention is installed on a wall surface. FIG. 19 is a diagram illustrating a modified example in which the wall-mounted drum type washing machine in accordance with an embodiment of the present invention is installed on a wall surface.

Referring to FIG. 18, the rear panel 120 is installed on the wall surface W using a plurality of coupling members 190. Specifically, the rear panel 120 is directly attached to the wall surface W, at a planar surface at the edge of the rear surface thereof.

When the rear panel 120 is directly attached to the wall surface W, the coupling member 190 is coupled to the wall surface W through a hole 121 in the rear panel 120.

Accordingly, the rear panel 120 may be reliably fixed to the wall surface W. Therefore, even when an external force is applied to the wall-mounted drum type washing machine, it is possible to prevent the wall-mounted drum type washing machine from falling down. Furthermore, since a separate bracket for fixing the wall-mounted drum type washing machine to the wall is not needed, the number of parts and weight of the wall-mounted drum type washing machine may be reduced.

Referring to FIG. 19, an additional buffer member 192 may be between the rear panel 120 and the wall surface W. Since the rear panel 120 and the wall surface W do not directly contact each other because of the buffer member 192, it is possible to prevent vibrations of the drum 156 from being transmitted to the wall surface W through the rear panel 120 during the operation of the wall-mounted drum type washing machine. Accordingly, it is possible to reduce vibrations and noise occurring during the washing operation of the wall-mounted drum type washing machine.

The operation of the wall-mounted drum type washing machine in accordance with an embodiment of the present invention will be described as follows.

When a user puts laundry into the drum 156 and then starts a washing operation, wash water is supplied into the tub 130 through the water supply pipe 152 by the operation of the water supply valve 154.

At this time, the wash water supplied along the water supply pipe 152 on the top surface of the cabinet 110 is supplied to the tub 130 through the rear panel 120. Specifically, the wash water is supplied to the tub 130 through the concave mounting groove 122 in the rear panel 120 (refer to FIGS. 11 and 12).

While the wash water flows the water supply pipe 152 to pass through the rear panel 120, the wash water flows to the rear side of the tub 130. Then, the wash water is supplied to the front side from the rear side of the tub 130.

Therefore, since the wash water supplied from the rear surface of the tub 130 is supplied to both of the rear surface and the circumferential surface of the drum 156, the wash water may wash foreign matters remaining on the inner wall of the tub 130 and the outer wall of the drum 156.

When the supply of the wash water is completed, power is applied to the motor 182 to rotate the drum 156 via the rotating shaft 184 and the support 186. Then, a wash operation is performed. When the wash operation is completed after a preset time, movement of the drum 156 is stopped, and the drain valve 42 in the second drain pipe 40 is opened to discharge the wash water.

At this time, the body 52 and the second drain pipe 40 already store some wash water, before the drain valve 42 is opened. As the wash water is discharged to the second drain pipe 40 at the same time as the drain valve 42 is opened, a negative pressure is generated to pull the wash water in the body 52 through the outlet 61, the siphon induction pipe 74, and the flow path 76.

That is, as the negative pressure is generated in the body 52, siphon pressure is applied to the wash water flowing to the first drain pipe 30 having a small diameter than the diameter of the second drain pipe 40, thereby increasing the drain pressure. Accordingly, the discharge of detergent bubbles and wash water remaining in the drum 156 or the tub 130 may be promoted.

As such, the drain device 30, 40, and 50 in accordance with an embodiment of the present invention promotes the drainage process using the siphon principle, unlike the conventional drain device using the free fall principle. Therefore, it is possible to not only drain the wash water more smoothly, but also reduce the drain time.

Figure 20:
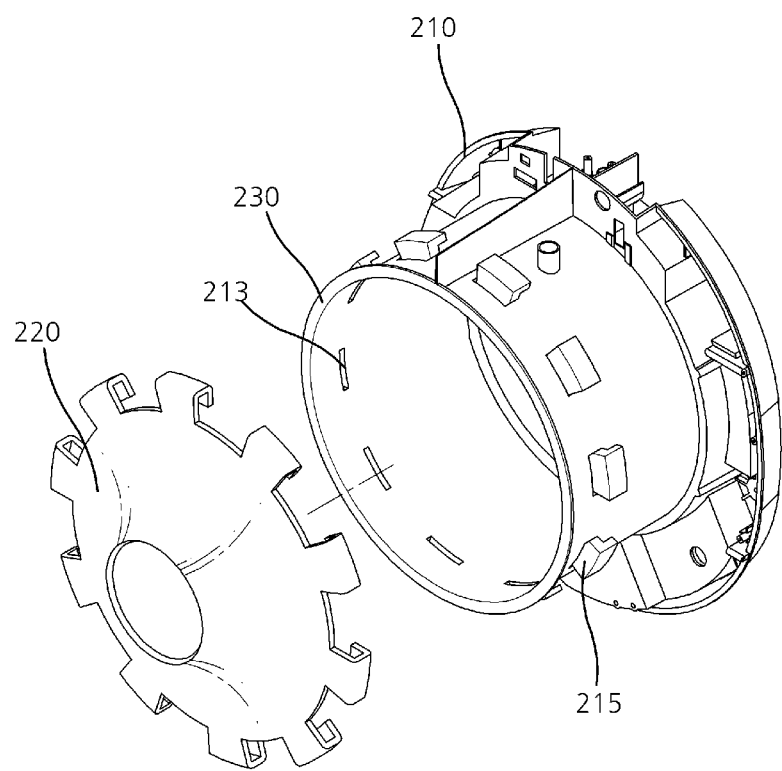
FIG. 20 is an exploded perspective view of a gasket mounting structure for a wall-mounted drum type washing machine in accordance with another embodiment of the present invention.
Figure 21:
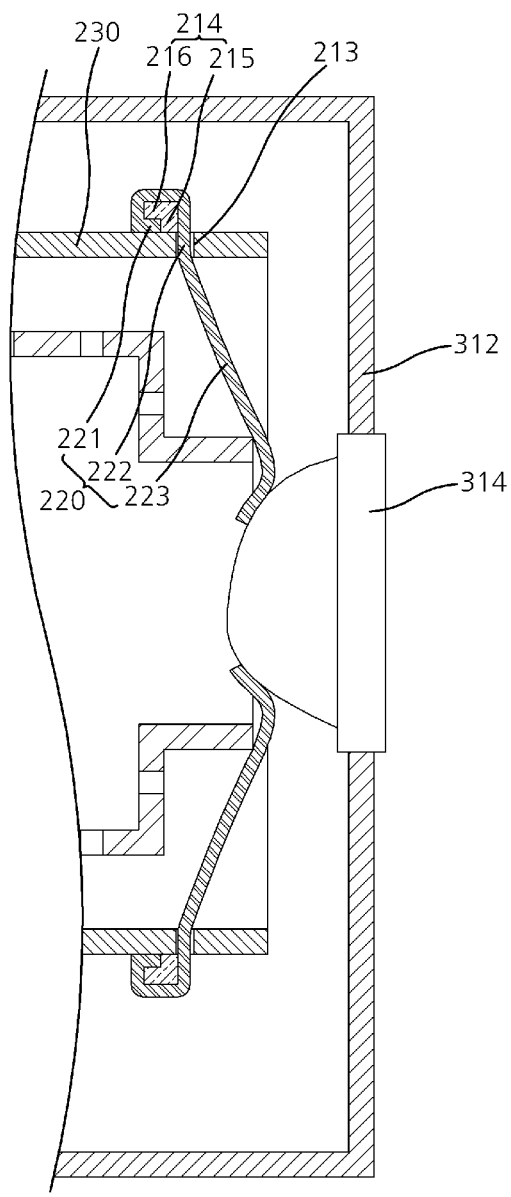
FIG. 21 is a cross-sectional view of the gasket mounting structure for a wall-mounted drum type washing machine in accordance with an embodiment of the present invention.
Figure 22:
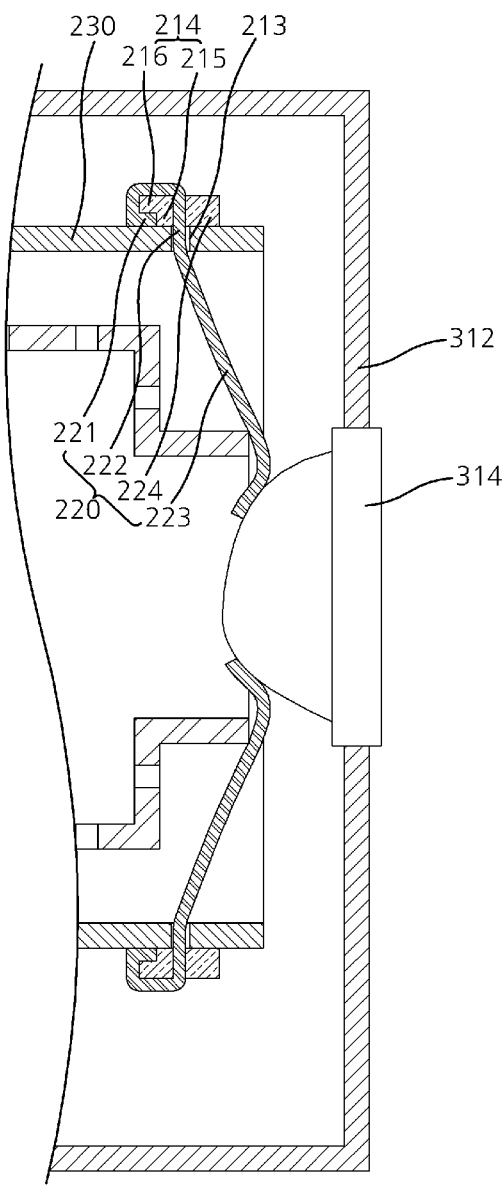
FIG. 22 is a cross-sectional view illustrating a protrusion body added to the gasket for a wall-mounted drum type washing machine in accordance with an embodiment of the present invention.
Figure 23:
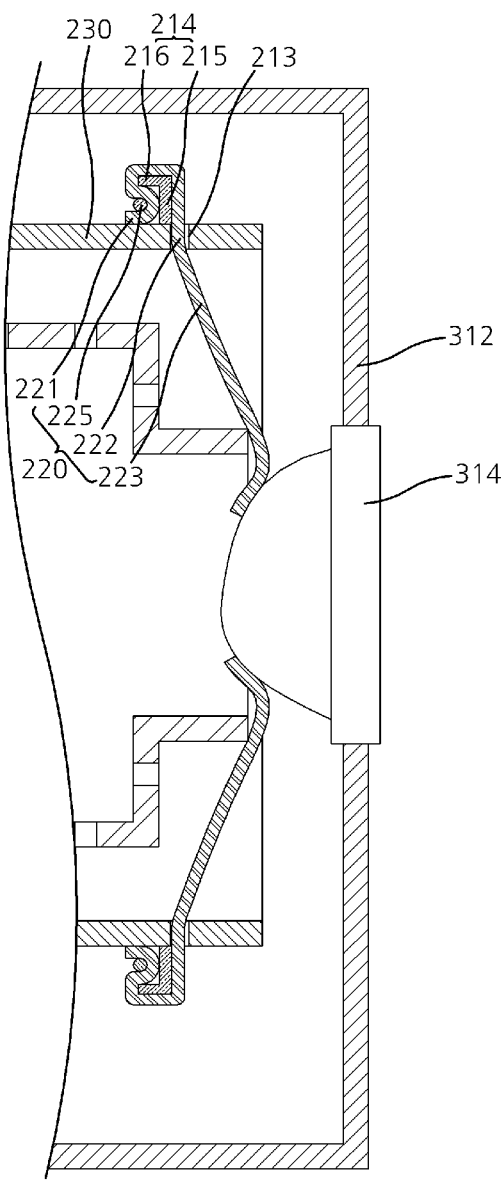
FIG. 23 is a cross-sectional view illustrating a ring spring added to the gasket for the wall-mounted drum type washing machine in accordance with an embodiment of the present invention.

FIG. 20 is an exploded perspective view of a gasket mounting structure for a wall-mounted drum type washing machine in accordance with another embodiment of the present invention. FIG. 21 is a cross-sectional view of the gasket mounting structure for the wall-mounted drum type washing machine in accordance with an embodiment of the present invention. FIG. 22 is a cross-sectional view illustrating a protrusion gasket added to the gasket for the wall-mounted drum type washing machine in accordance with an embodiment of the present invention. FIG. 23 is a cross-sectional view illustrating a ring spring added to the gasket for the wall-mounted drum type washing machine in accordance with an embodiment of the present invention.

Referring to FIGS. 20 to 23, the gasket 220 for a wall-mounted drum type washing machine in accordance with an embodiment of the present invention has one end portion coupled to a tub 230 and another end portion in contact with a door 314 on a cover unit 312.

The gasket 220 comprises an elastic material such as rubber, and has a wrinkled surface. Therefore, the length of the gasket 220 may vary when vibrations occur in the tub 230.

The tub 230 includes a plurality of mounting holes 213 in the front end portion thereof and a plurality of lock portions 214 that protrude from the outer circumference of thereof. The gasket 220 is locked and fixed to the lock portions 214 and extends through the mounting holes 213.

Each of the lock portions 214 includes a coupling protrusion 215 and a lock protrusion 216.

The coupling protrusion 215 protrudes outward from the outer surface of the tub 230. The coupling protrusion 215 is adjacent to the mounting hole 213. The plurality of mounting holes 213 are arranged along the circumferential surface of the tub 230.

The lock protrusion 216 extends from the end of the coupling protrusion 215 in the opposite direction of the mounting hole 213. The lock portion 214 may include only the coupling protrusion 215, without the lock protrusion 216.

The gasket 220 in accordance with an embodiment of the present invention includes a hooked body 221, a passing body 222, and a coupling body 223.

The hooked body 221 has a hooked shape that locks to the lock portion 214. The hooked body 221 is hooked to attach directly to the coupling protrusion 215, and has an end locked and fixed to the lock protrusion 216.

The passing body 222 is connected to the hooked body 221, and passes through the mounting hole 213. The passing body 222 may be integral with the hooked body 221. The passing body 222 may additionally include a separate seal to prevent leakage through the mounting hole 213.

The coupling body 223 is connected to the passing body 222. The coupling body 223 may be integral with the passing body 222. The coupling body 223 generally contacts the door 314 and prevents wash water from leaking through a gap between the tub 230 and the door 314.

The gasket 220 in accordance with an embodiment of the present invention further includes a protrusion body 224. The protrusion body 224 is coupled to the hooked body 221, and protrudes in a side direction to lock to the tub 230.

The protrusion body 224 may be bonded to the hooked body 221, or integral with the hooked body 221, to contact the outer surface of the tub 230.

The end portion of the hooked body 221 inserted into the lock portion 214 has a U shape, and the gasket 220 further includes a ring spring 225. The ring spring 225 is inserted into an end portion of the hooked body 221 passing through the mounting hole 213, and attaches the hooked body 221 directly to the circumferential surface of the tub 230.

The ring spring 225 has a diameter corresponding to the tub 230, to surround the tub 230, and that expands by an external force.

The end portion of the hooked body 221 is curved to attach directly to the lock protrusion 216, the coupling protrusion 215, and the tub 230, thereby forming an installation space into which the ring spring 225 is inserted.

In this way, the shape of the cabinet, the connection structure of the tub, and the mounting structure of the driving unit may be improved to reduce the size and number of parts of the wall-mounted drum type washing machine.

Figure 24:
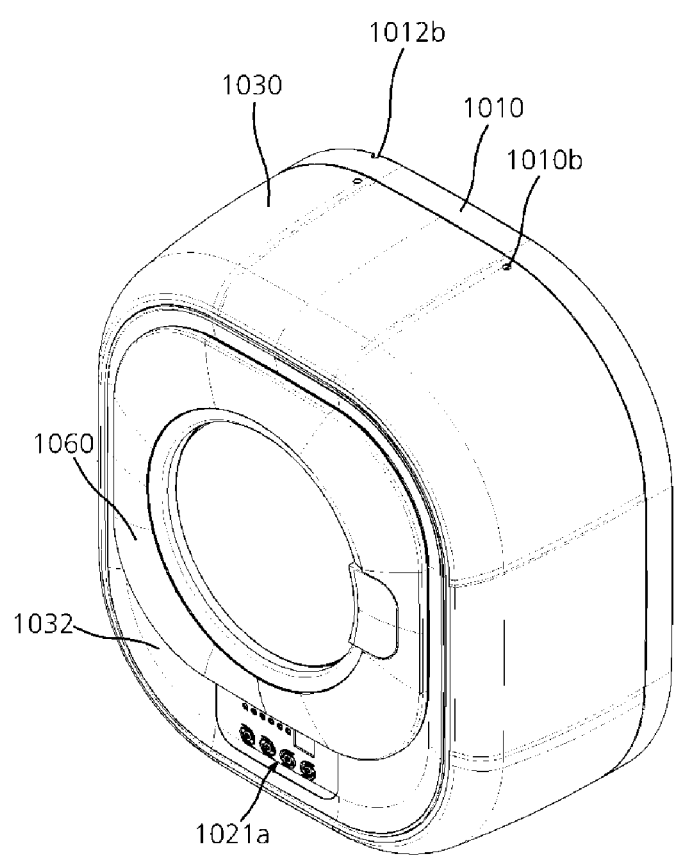
FIG. 24 is a perspective view of a wall-mounted drum type washing machine in accordance with another embodiment of the present invention.
Figure 25:
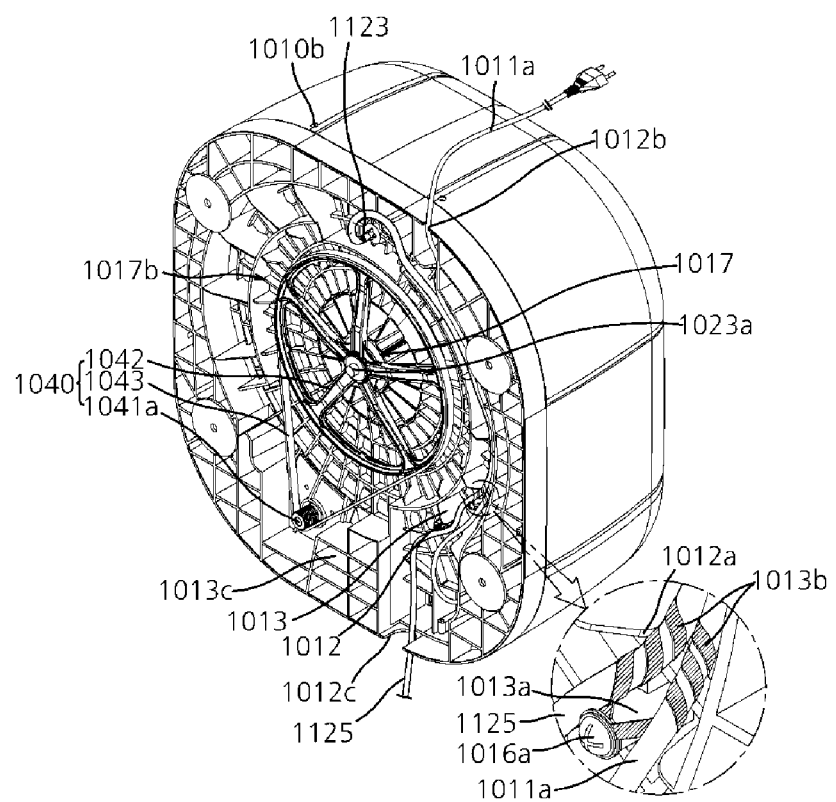
FIG. 25 is a rear perspective view of the wall-mounted drum type washing machine in accordance with another embodiment of the present invention.
Figure 26:
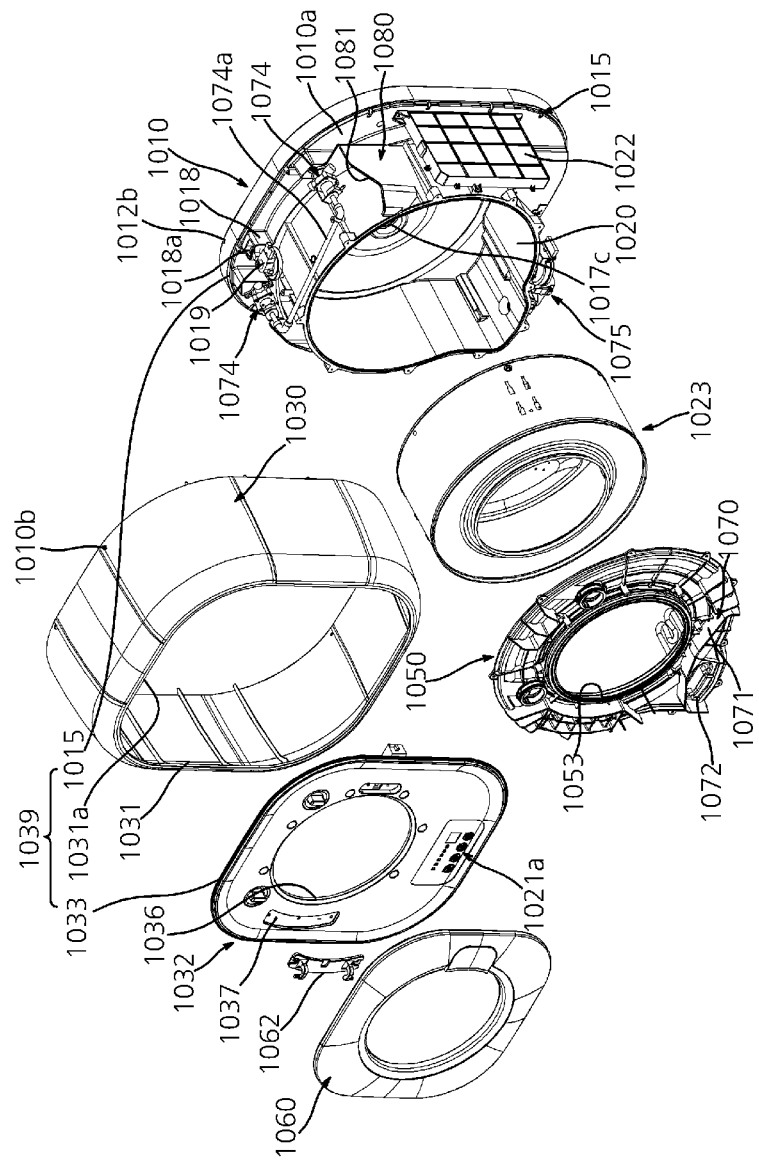
FIG. 26 is an exploded perspective view of the wall-mounted drum type washing machine in accordance with another embodiment of the present invention.
Figure 27:
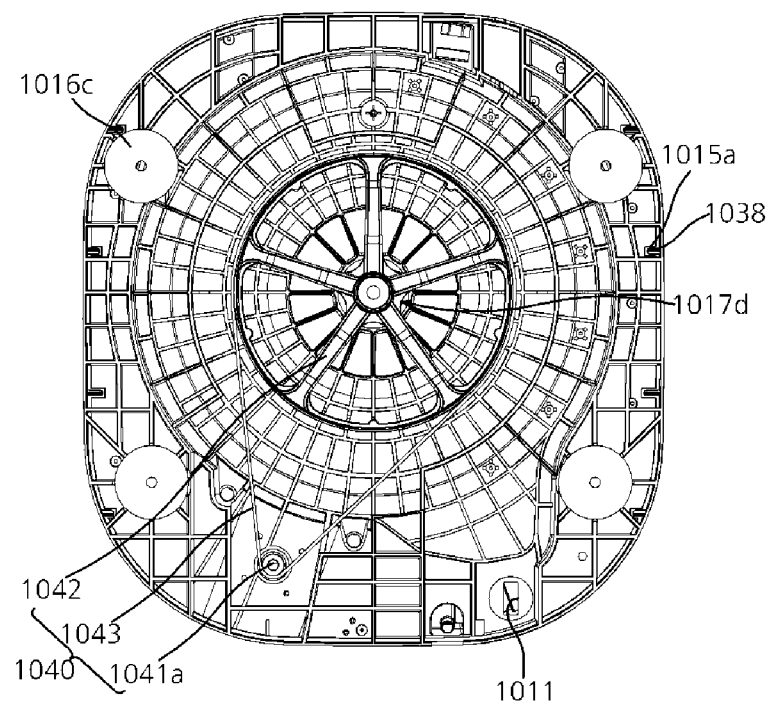
FIG. 27 is a rear view of the wall-mounted drum type washing machine in accordance with another embodiment of the present invention.

FIG. 24 is a perspective view of a wall-mounted drum type washing machine in accordance with an additional embodiment of the present invention. FIG. 25 is a rear perspective view of the wall-mounted drum type washing machine in accordance with the additional embodiment of the present invention. FIG. 26 is an exploded perspective view of the wall-mounted drum type washing machine in accordance with additional embodiment of the present invention. FIG. 27 is a rear view of the wall-mounted drum type washing machine in accordance with the additional embodiment of the present invention.

Referring to FIGS. 24 to 27, the wall-mounted drum type washing machine in accordance with an additional embodiment of the present invention includes a rear panel 1010, a tub 1020, a drum 1023, a driving unit 1040, a water supply device 1074 and 1074a, and a drain device 1075. The rear panel 1010 is mounted on a wall surface. The tub 1020 contains wash water and is supported by the rear panel 1020.

The rotatable drum 1023 is in the tub 1020 and houses the laundry. The driving unit 1040 provides power to rotate the drum 1023. The water supply device 1074 and 1074a supplies wash water to the tub 1020. The drain device 1075 drains wash water from the tub 1020 to the outside.

The tub 1020 includes a front panel 1050 thereon, and the rear panel 1010 includes a box unit 1030 thereon. The front panel 1050 has an opening 1053 therein, and the box unit 1030 surrounds the tub 1020. The box unit 1030 includes a cover unit 1032 at the front side thereof so as to cover the front panel 1050.

As such, the front panel 1050 is covered by the cover unit 1032, the cover unit 1032 is elastically coupled and reliably fixed to the box unit 1030, and the box unit 1030 is coupled to the rear panel 1010 mounted on the wall surface W using a coupling member or the like. Therefore, the tub 1020 may be supported while the vibrations of the front portion of the tub 1020 are reduced, without a separate damper or damping spring to support the front portion of the tub 1020.

Figure 40:
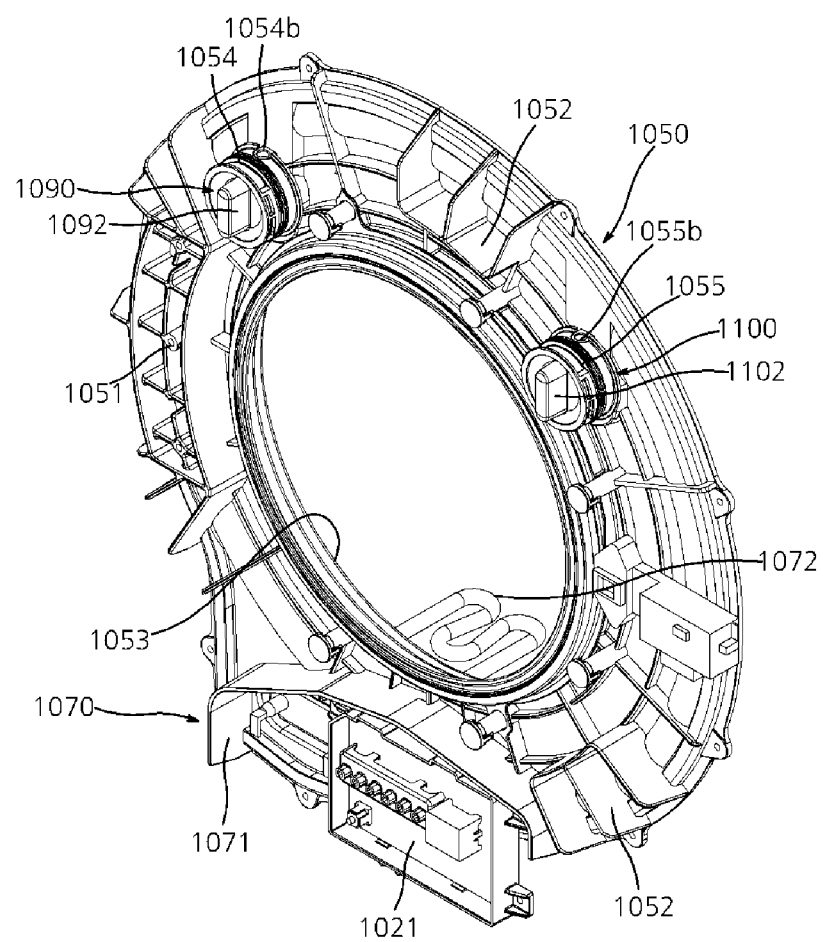
FIG. 40 is a perspective view of the front panel provided with the bypass unit for a wall-mounted drum type washing machine in accordance with another embodiment of the present invention.

The cover unit 1032 includes a door 1060 that opens and closes, and the front panel 1050 includes a detergent box 1090 and a conditioner box 1100 which are removable (refer to FIG. 40).

When a user wants to perform a washing operation, the user opens the door 1060 on the cover unit 1032 of the drum type washing machine mounted on a wall surface W (refer to FIG. 31), and puts laundry into the drum 1023.

Then, the user removes the detergent box 1090 and the conditioner box 1100 from the front panel 1050, puts detergent and fabric conditioner into the detergent box 1090 and the conditioner box 1100, respectively, and inserts the detergent box 1909 and the conditioner box 1100 into the front panel 1050.

When the user closes the door 1060 and operates a manipulation unit 1021a, wash water is supplied into the tub 1020 by the water supply device 1074 and 1074a, and power is applied to the driving unit 1040. Then, while the drum 1023 is rotated, the washing operation is started.

When the washing operation is completed, the wash water is discharged to the outside of the box unit 1030 by the operation of the drain device 1075.

In this aspect of the present invention, the small drum 1023 having a weight of 2~4 kg is on the rear panel 1010 mounted on the wall surface. Therefore, baby clothes, underwear, and shirts, which need to be washed frequently, may be easily washed without burden.

Similarly, whenever a small amount of laundry is collected, the user may wash the laundry without worrying about the consumption of wash water and electricity.

Furthermore, the wall-mounted drum type washing machine in accordance with an embodiment of the present invention further includes a control block 1022, a power line 1011a, and a guide unit 1012. The control block is on the rear panel 1010. The power line 1011a extends from the control block 1022 to the outside of the rear panel 1010. The guide unit 1012 is on or in the rear surface of the rear panel 1010, and guides the power line 1011a to the outside of the rear panel 1010, and fixes the power line 1011a.

Since the rear panel 1010 includes the guide unit 1012, the power line 1011a may extend in a side direction of the rear panel 1010. Accordingly, the rear panel 1010 may be easily mounted on the wall surface.

The power line 1011a of the wall-mounted drum type washing machine in accordance with an embodiment of the present invention is fixed along the guide unit 1012 in the rear panel 1010, extends in a circumferential direction of the rear panel 1010, and is exposed to the outside of the rear panel 1010.

The power line 1011a is connected to the control block 1022 and extends through the rear panel 1010 and along the guide unit 1012.

The rear panel 1010 has a through-hole 1011 through which the power line 1011a passes to the control block 1022 on a front surface 1010a of the rear panel 1010.

The power line 1011a extending from the control block 1022 toward the rear surface of the rear panel 1010 through the through-hole 1011 is guided in the circumferential direction of the rear panel 1010 along the guide unit 1012 on the rear surface of the rear panel 1010.

Therefore, since the power line 1011a is exposed to the outside through a side of the rear panel 1010, the portion of the power line 1011a exposed to the outside of the drum type washing machine is disposed adjacent to the wall surface W. Accordingly, the power line 1011a may be directly attached to the wall surface W.

Since the power line 1011a extends to the rear surface of the rear panel 1010 and is exposed to the outside through the upper or lower side of the rear panel 1010, the exterior of the wall-mounted drum type washing machine may be elegantly finished.

The guide unit 1012 includes a fixing portion 1012a that guides the power line 1011a from the through-hole 1011 to one side of the rear panel 1010 and fixes the power line 1011a.

The fixing portion 1012a is on the rear surface of the rear panel 1010 and fixes the power line 1011a to a space between the rear panel 1010 and the wall surface W.

Therefore, the power line 1011a extending to the rear surface of the rear panel 1010 is not moved by vibrations generated during washing operations, but remains in a constant position.

The rear panel 1010 includes a plurality of reinforcement ribs 1013c formed on the rear surface thereof and a plurality of radial ribs 1013 formed in a radial manner based on the center thereof.

The fixing portion 1012a comprises cut-outs in part of the radial ribs 1013. The plurality of radial ribs 1013 are spaced a predetermined distance from each other, thereby forming a space for the power line 1011a to be placed.

The rear panel 1010 has a substantially rectangular shape of which the corners are rounded. The rear panel 1010 may have any one of various shapes such as circular or elliptical, and the present invention is not limited to the above-described shape of the rear panel 1010.

Since the circumference of the rear panel 1010 contacts the wall, a space is formed between the rear panel 1010 and the wall (refer to FIG. 25).

In addition to the space, the plurality of reinforcement ribs 1013c and radial ribs 1013 may be formed on the rear surface of the rear panel 1010 without interfering with the wall surface W.

Since the strength of the rear panel 1010 is reinforced by the reinforcement ribs 13c and the radial ribs 1013, it is possible to prevent the rear panel 1010 from being deformed or broken by vibrations generated by the rotation of the drum 1023.

The through-hole 1011 is formed at the bottom of the rear panel 1010, and the plurality of fixing portions 1012a in the radial ribs 1013 serve as a path through which the power line 1011a passes.

The plurality of fixing portions 1012a are on consecutive radial ribs 1013 so that the power line 1011a extends to the top of the rear panel 1010 while forming a curve similar to a semicircle.

As the plurality of fixing portions 1012a are arranged up to the top of the rear panel 1010 a predetermined distance from each other, the power line 1011a inserted into the fixing portions 1012a may be guided from the bottom to the top of the rear panel 1010.

An installation hole 1013a is between adjacent radial ribs 1013, and a cable member 1013b is wound around the power line 1011a and fixed to the installation hole portion 1013a with a coupling member.

The cable member 1013b may comprise a wire maintaining a shape formed by an external force, or other material having a similar property.

Therefore, when the power line 1011a is held by the cable member 1013b, and the cable member 1013b is fixed to the installation hole portion 1013a by the coupling member, it is possible to prevent the power line 1011a from moving to the outside of the fixing portion 1012a.

The rear panel 1010 has a first through-groove 1012b in the circumference thereof so that the power line 1011a guided along the fixing portions 1012a is exposed to the outside through the top of the rear panel 1010.

Therefore, the power line 1011a is exposed to the outside of the top of the rear panel 1010 through the first through-groove 1012b.

The rear panel 1010 has a second through-groove 1012c in the bottom or lower circumference thereof so that the power line 1011a extending from the through-hole portion 1011 is exposed to the outside through the bottom of the rear panel 1010.

Therefore, when the power line 1011a is guided toward the bottom of the rear panel 1010, the power line 1011a is exposed to the outside of the rear panel 1010 through the second through-groove 1012c.

Figure 28:
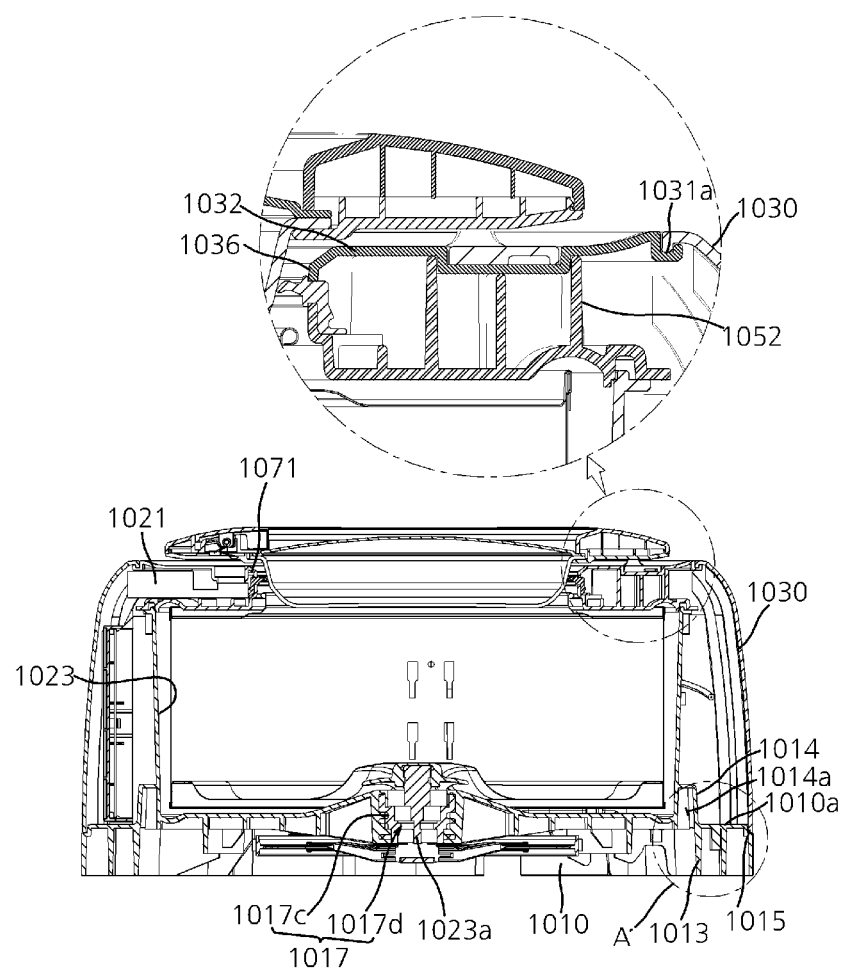
FIG. 28 is a cross-sectional view of the wall-mounted drum type washing machine in accordance with another embodiment of the present invention.
Figure 29:
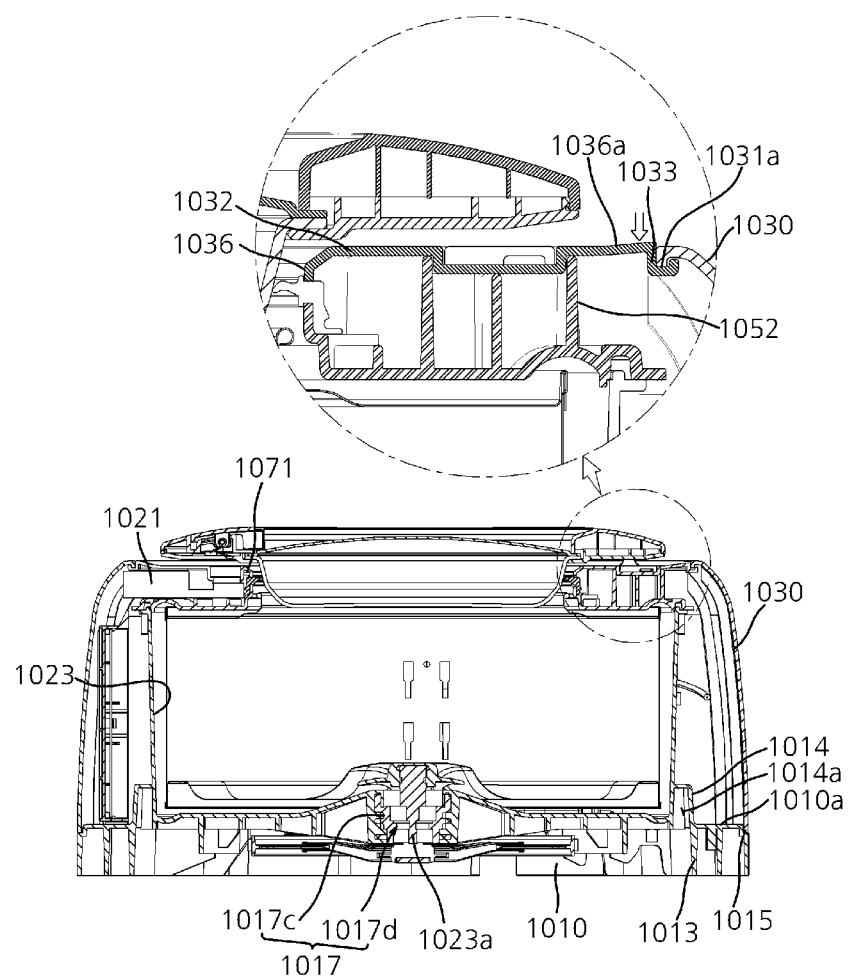
FIG. 29 is an operation state diagram illustrating an elastic assembling unit of the wall-mounted drum type washing machine in accordance with another embodiment of the present invention.
Figure 30:
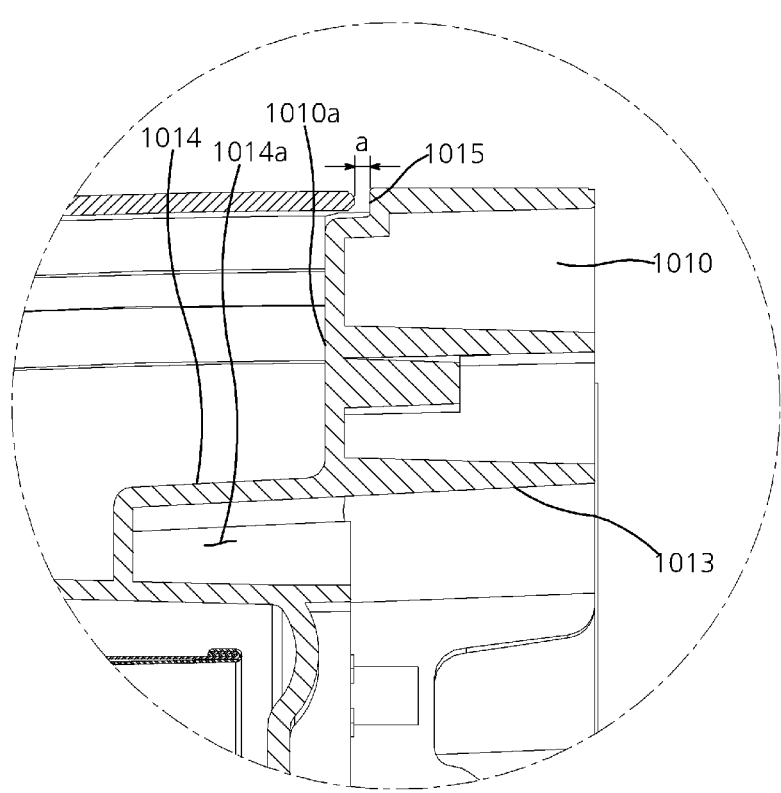
FIG. 30 is an expanded view of portion A illustrated in FIG. 28.
Figure 31:
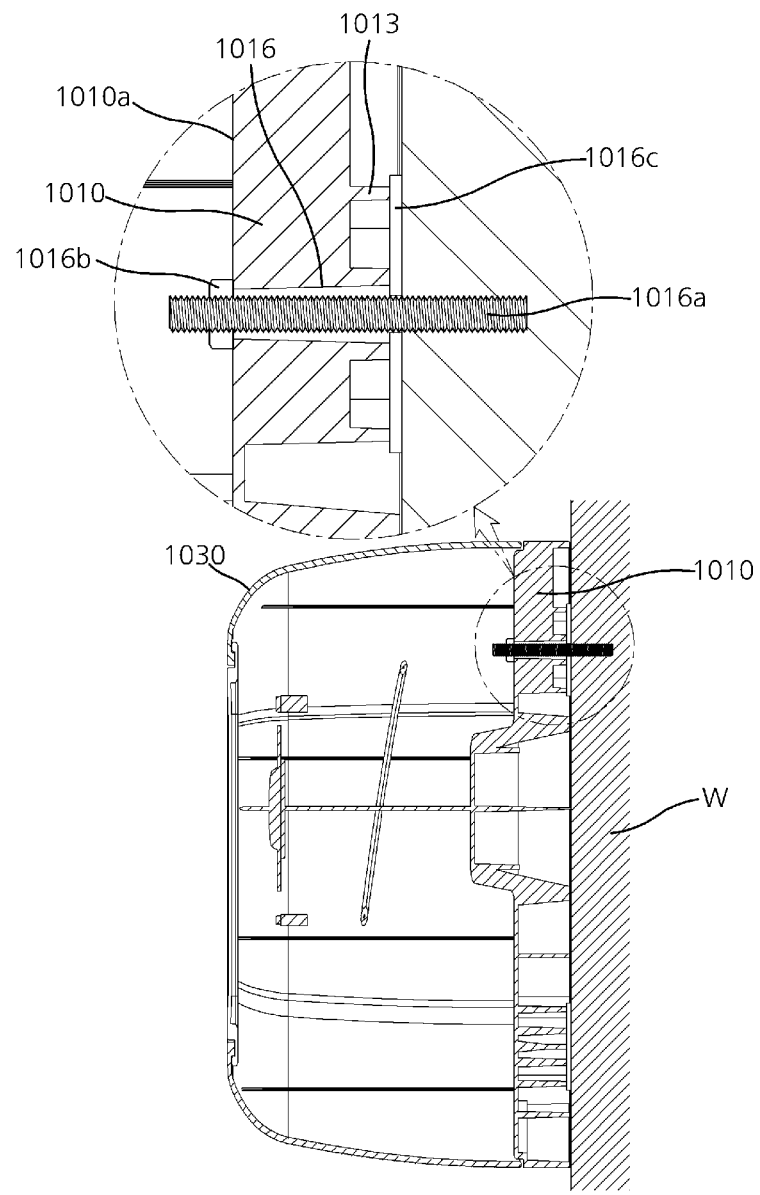
FIG. 31 is a cross-sectional view of a mounting structure for a wall-mounted drum type washing machine in accordance with another embodiment of the present invention.

FIG. 28 is a cross-sectional view of the wall-mounted drum type washing machine in accordance with the additional embodiment of the present invention. FIG. 29 is a diagram illustrating an elastic assembling unit of the wall-mounted drum type washing machine in accordance with the additional embodiment of the present invention. FIG. 30 is an expanded view of portion A illustrated in FIG. 28. FIG. 31 is a cross-sectional view of an exemplary mounting structure for a wall-mounted drum type washing machine in accordance with the additional embodiment of the present invention.

Referring to FIGS. 28 to 31, the wall-mounted drum type washing machine in accordance with an additional embodiment of the present invention further includes a reinforcement unit 1014 connecting the tub 1020 and the rear panel 1010 and surrounding the tub 1020.

The rear panel 1010 has a panel shape and is mounted on the wall surface W, and the cylindrical tub 1020 protrudes to the front side from the front surface 1010a of the rear panel 1010.

The reinforcement unit 1014 at the connection portion between the tub 1020 and the rear panel 1011 surrounds the base of the tub 1020 in a ring shape.

Since the reinforcement unit 1014 surrounds the base of the tub 1020, a load applied to the physical connection between the tub 1020 and the rear panel 1010 can be distributed.

Therefore, it is possible to prevent the base of the tub 1020 from being deformed or broken.

Furthermore, the plurality of radial ribs 1013 and reinforcement ribs 1013c on the rear surface of the rear panel 1010 improve the strength of the rear panel 1010. Therefore, the rear panel 1010 may be prevented from being deformed or broken.

Since the reinforcement unit 1014 is integral with the reinforcement ribs 1013c, the reinforcement unit 1014 may prevent the deformation of the base of the tub 1020, and the reinforcement ribs 1013c may prevent the deformation of the rear panel 1010.

Therefore, the strength of the connection between the tub 1020 and the rear panel 1010 is improved.

The tub 1020 protrudes to the front side from the rear panel 1010, and the reinforcement ribs 1013 protrude to the rear side from the rear panel 1010.

Since the reinforcement unit 1014 protrudes to the front side from the rear panel 1010 and is integrally connected to the tub 1020, the reinforcement unit 1014 may surround the base of the tub 1020, and connect the tub 1020 and the rear panel 1010 at a position away from the front surface 1010a of the rear panel 1010.

The upper end of the reinforcement unit 1014 is curved, and is integrally connected to the tub 1020. As the upper end of the reinforcement unit 1014 is curved, a space 1014a is between the tub 1020 and a sidewall of the reinforcement unit 1014.

Furthermore, the reinforcement unit 1014 and the front surface 1010a of the rear panel 1010 form a stair shape.

Figure 34:
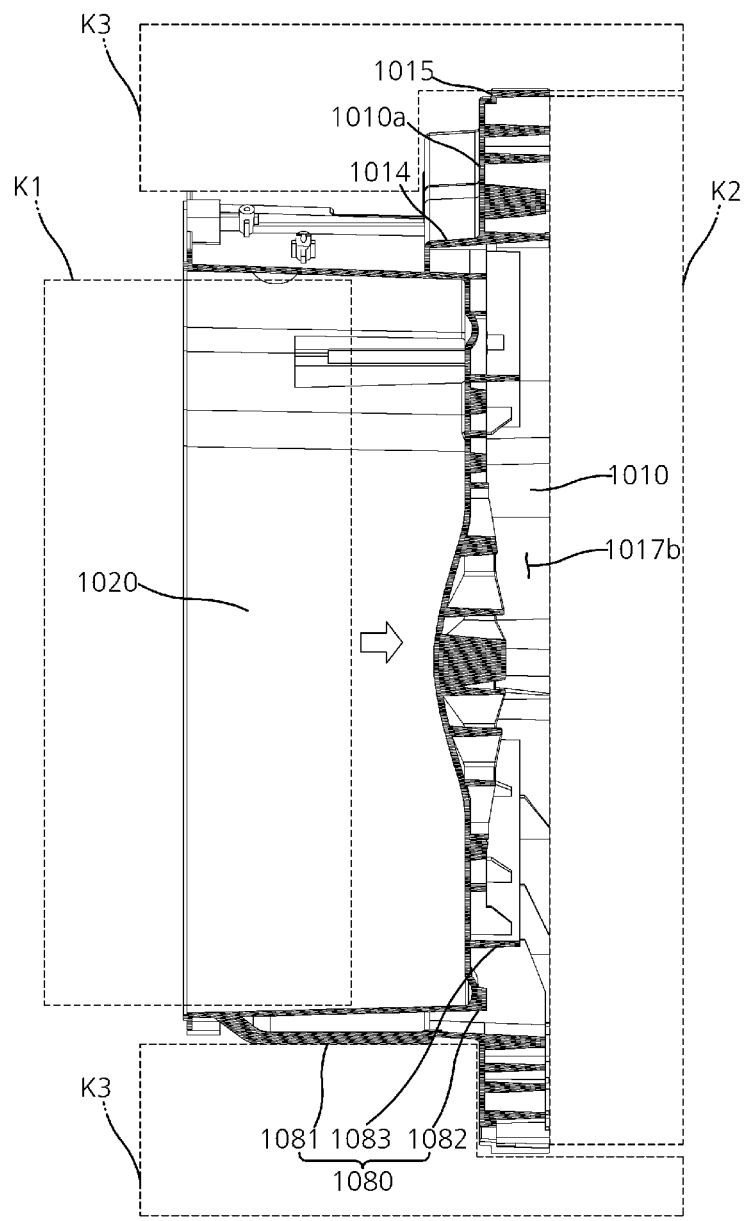
FIG. 34 is a cross-sectional view of the drain unit for a wall-mounted drum type washing machine in accordance with another embodiment of the present invention.

Therefore, the rear panel 1010 and integrated tub 1020 may be manufactured using a first mold K1 at the front surface 1010a of the rear panel 1010, a second mold K2 at the rear side of the rear panel 1010, and a third mold K3 at the side of the rear panel 1010 and the tub 1020 (refer to FIG. 34).

Using the above-described molding process, the rear panel 1010, the tub 1020, and the reinforcement unit 1014 are integrally formed.

The rear panel 1010 has a receiving portion 1015 on the circumference thereof, coupled to the box unit 1030.

When the rear panel 1010 and the box unit 1030 are assembled, an end portion of the box unit 1030 may be received (e.g., precisely received) on the receiving portion 1015 on the circumference of the rear panel 1010.

The receiving portion 1015 is located behind or below the front surface 1010a of the rear panel 1010, and the reinforcement unit 1014, the front surface 1010a, and the receiving portion 1015 may form a stair shape.

Therefore, when the box unit 1030 and the rear panel 1010 are assembled, the end portion of the box unit 1030 may be precisely placed on a step defined by the receiving portion 1015 and the front surface 1010a.

Furthermore, since the base of the tub 1020 is surrounded by the reinforcement unit 1014 protruding from the front surface 1010a, the strength of the connection between the tub 1020 and the rear panel 1010 is improved.

The reinforcement unit 1014, the front surface 1010a, and the receiving portion 1015 form a stair shape extending to the front side toward the reinforcement unit 1014 from the receiving portion 1015.

Therefore, after the rear panel 1010 integrated with the tub 1020 is completely manufactured, the mold disposed at the side of the rear panel 1010 and the tub 1020 may be easily removed.

Furthermore, since the reinforcement unit 1014, the front surface 1010a, and the receiving portion 1015 may form a stair shape extending to the front side toward the tub 1020, the reinforcement unit 1014, the front surface 1010a, and the receiving portion 1015 do not interfere with the mold that forms the stair shape when the mold is removed from the integrated rear panel and tub.

The rear panel 1010 has a through-hole 1016 into which a coupling member 1016*a* is inserted and coupled to the wall surface W, and a buffer member 1016*c* is between the through-hole 1016 and the wall surface W.

The rear panel 1010 has a front side having a rectangular shape or a similar shape to the rectangular shape, and includes a plurality of through-holes 1016, for example at four respective corners thereof (refer to FIG. 31).

The plurality of radial ribs 1013 and reinforcement ribs 13*c* are on the rear surface of the rear panel 1010 having through-holes 1016 therein.

The radial ribs 1013 are spaced at a predetermined distance from the through-holes 1016, and the reinforcement ribs 1013*c* connect the respective radial ribs 1013.

Each coupling member 1016*a* is inserted into the through-hole 1016 and coupled to the wall surface W, and a nut member 1016*b* coupled to the coupling member 1016*a* is directly attached to the coupling member at the front surface 1010*a* of the rear panel 1010.

The vibrations generated during washing operations are transmitted by the nut member 1016*b* to the coupling member 1016*a* that attaches the rear panel 1010 to the wall.

In the wall-mounted drum type washing machine in accordance with an embodiment of the present invention, since the nut member 1016*b* is on the front surface 1010*a*, a gap exists between the nut member 1016*b* and the wall surface W, and the reinforcement ribs 1013 and the buffer member 1016*c* in the gap suppress the vibrations of the drum 1023 from being transmitted to the wall W.

Figure 32:
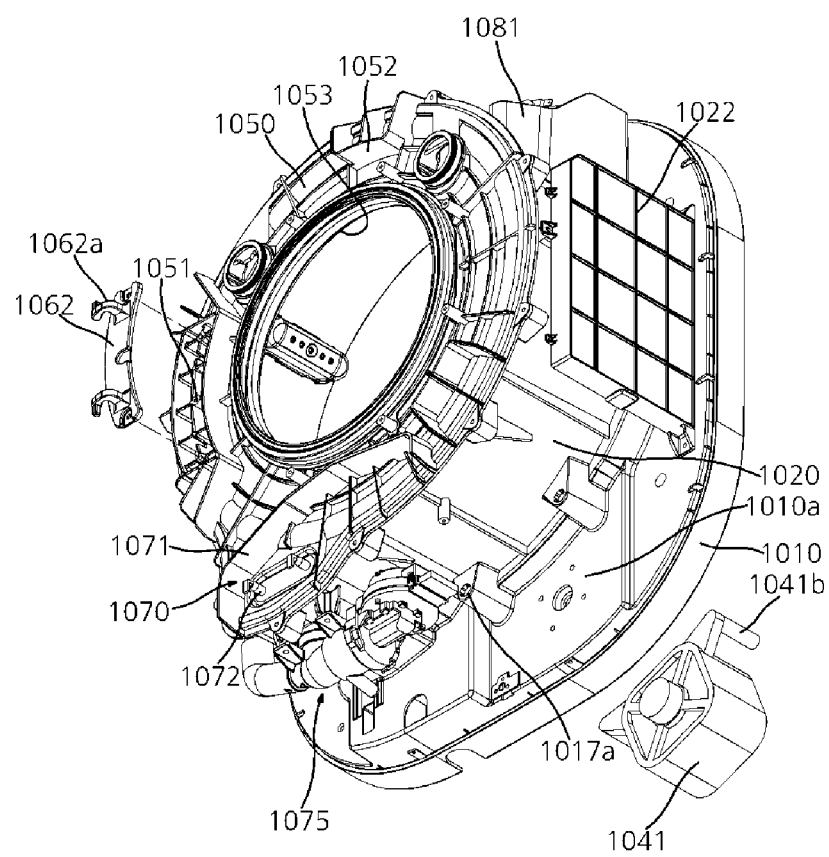
FIG. 32 is a perspective view of a front panel mounting structure for a wall-mounted drum type washing machine in accordance with another embodiment of the present invention.
Figure 33:
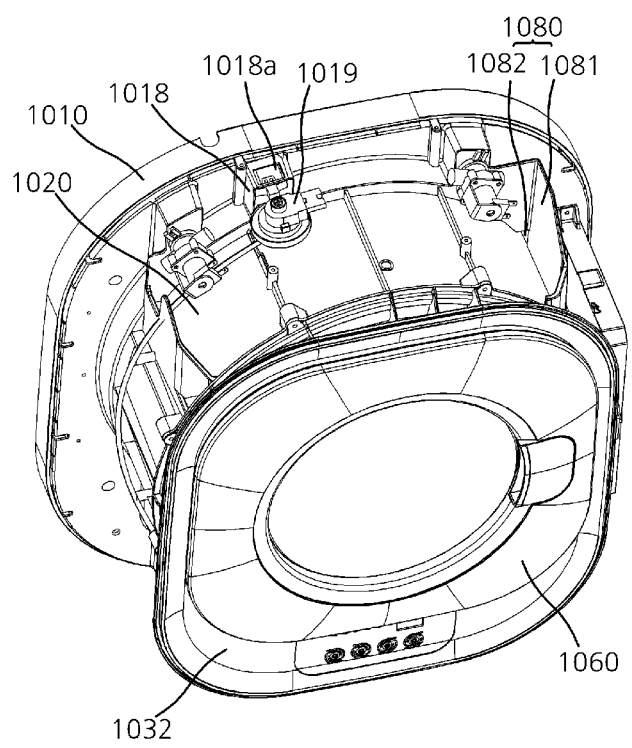
FIG. 33 is a perspective view of a water level sensor mounting structure and a drain unit for a wall-mounted drum type washing machine in accordance with another embodiment of the present invention.
Figure 35:
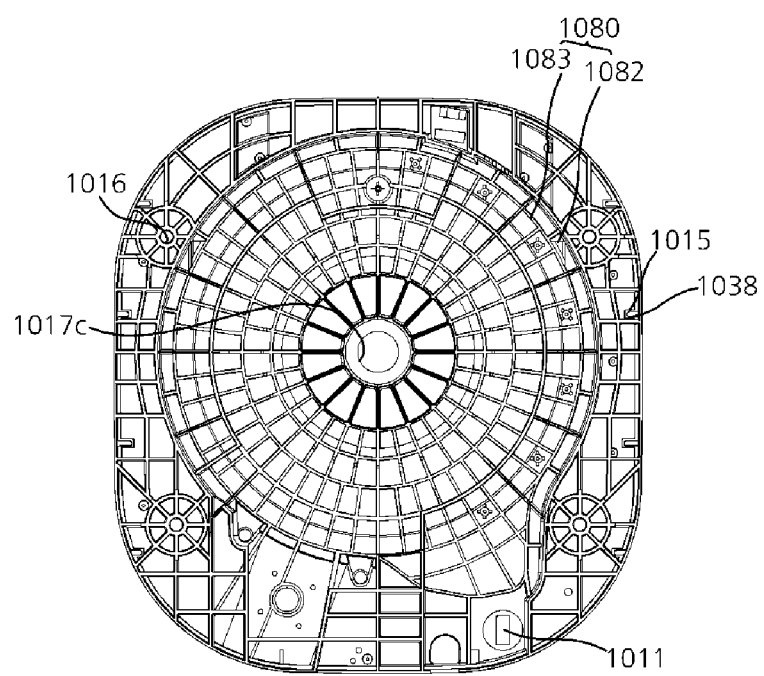
FIG. 35 is a rear view of the rear panel for a wall-mounted drum type washing machine in accordance with another embodiment of the present invention.

FIG. 32 is a perspective view of a front panel mounting structure for a wall-mounted drum type washing machine in accordance with an additional embodiment of the present invention. FIG. 33 is a perspective view of a water level sensor mounting structure and a drain unit for a wall-mounted drum type washing machine in accordance with the additional embodiment of the present invention. FIG. 34 is a cross-sectional view of the drain unit for the wall-mounted drum type washing machine in accordance with the additional embodiment of the present invention. FIG. 35 is a rear view of the rear panel of the wall-mounted drum type washing machine in accordance with the additional embodiment of the present invention.

Referring to FIGS. 32 to 35, the wall-mounted drum type washing machine in accordance with an embodiment of the present invention further includes a coupling unit 1017 (refer to FIG. 28) and a disposition portion 1017*b*. The coupling unit 1017 is in the rear panel 1010 and coupled to a rotatable driving shaft 1023*a* attached to the drum 1023. The disposition portion 1017*b* serves to prevent the driving unit 1040 (refer to FIG. 25) connected to the driving shaft 1023*a* from interfering with the wall surface W.

Since the coupling unit 1017 connects the driving unit 1040 to the drum 1023 in the center of the rear panel 1010 and attached to the tub 1020, the power provided by the driving unit 1040 is transmitted to the drum 1023.

The disposition portion 1017*b* comprises a concave portion of the rear surface of the rear panel 1010. Since the driving unit 1040 is inside the disposition portion 1017*b*, a driving wheel 1042 rotated by the operation of the driving unit 1040 is prevented from interfering with the rear panel 1010 and the wall surface W.

The driving unit 1040 includes a motor 1041 that provides power to rotate the drum 1023, the driving wheel 1042 connected to the driving shaft 1023*a*, and a belt 1043 that transmits power from the motor 1041 to the driving wheel 1042.

The motor 1041 is on the front surface 1010*a* of the rear panel 1010, and has a rotating shaft 1041*a* extending to the rear surface of the rear panel 1010 through the rear panel 1010.

The driving wheel 1042 is inside the disposition portion 1017*b* at the rear surface of the rear panel 1010, and connected to the driving shaft 1023*a*.

The belt 1043 connects the rotating shaft 1041*a* and the driving wheel 1042 of the motor 1041*a*.

Therefore, when the power of the motor 1041 is transmitted to the driving wheel 1042 by the belt 1043 to rotate the driving wheel 1042, the drum 1023 connected to the driving shaft 1023*a* is rotated to perform a washing operation.

The coupling unit 1017 (refer to FIG. 28) includes a rotation hole 1017*c* in the rear panel 1010 and a bearing portion 1017*d* in the rotation hole 1017*c* that supports the rotatable driving shaft 1023*a*.

The rotatable driving shaft 1023*a* may be installed in the rear panel 1010 by the bearing portion 1017*d* in the rotation hole 1017*c*.

The drum 1023 is attached to the front end of the driving shaft 1023*a*, and the driving wheel 1042 is attached to the rear end of the driving shaft 1023*a*.

The disposition portion 1017*b* comprises a concave surface in the rear panel 1010 facing to the front side, and the driving unit 1040 is placed in the disposition portion 1017*b*.

Specifically, the disposition portion 1017*b* is formed by concaving the central portion of the rear panel 1010, where the driving wheel 1042 is positioned, to the front side.

Therefore, the driving wheel 1042 positioned inside the disposition portion 1017*b* may be rotated so as not to interfere with the rear panel 1010 and the wall surface W.

The motor 1041 may be on the rear surface of the rear panel 1010 so as to be directly connected to the driving shaft 1023*a*. That is, a direct connection-type motor may be installed, in addition to the driving unit 1040 described herein with regard to the present invention.

This structure may be easily understood by those skilled in the art to which the present invention pertains, and thus the detailed descriptions thereof are omitted herein.

The motor 1041 has a pair of fixing hole portions 1041*b* therein, and the rear panel 1010 has a pair of boss portions 1017*a* that extend to the front side. The fixing hole portions 1041*b* are inserted into the boss portions 1017*a*.

The fixing hole portions 1041*b* extend laterally from different side or corner surfaces of the motor 1041, and are curved in the downward direction.

The boss portions 1017*a* extend to the front side from the front surface 1010*a* of the rear panel 1010, and the fixing hole portions 1041*b* are inserted into the boss portion 1017*a*.

Therefore, when the fixing holes 1041*b* of the motor 1041 are inserted into the boss portion 1017*a*, the motor 1041 is primarily assembled at a precise position.

The motor 1041 is at the bottom of the front surface 1010*a* of the rear panel 1010, and placed between the boss portions 1017*a* so as to be primarily assembled. Then, the motor 1041 is coupled to the front surface 1010*a* using a coupling member.

The motor 1041 is primarily coupled to the rear panel 1010 by the fixing hole portions 1041*b* and the boss portions 1017*a*, and secondarily coupled to the rear panel 1010 by the separate coupling member 1016*a*.

Therefore, it is possible to prevent a gap which may occur between the motor 1041 and the rear panel 1010 due to the vibrations generated when the motor 1041 is driven.

Furthermore, the coupling member may be inserted into the fixing hole portions 1041b, thereby further increasing the coupling force between the fixing hole portions 104 1b and the boss portions 1017a.

The rear panel 1010 includes a protrusion portion 1018 therein, where the water level sensor 1019 is installed. The protrusion portion 1018 has an attachment/detachment hole 1018a for removing the water level sensor 1019.

The water level sensor 1019 is a pressure sensor installed in a separate pipe diverging from the drain pipe connected to the bottom of the tub 1020.

The water level sensor 1019 senses the internal pressure of the tub 1020 and determines the amount of wash water in the tub 1020.

The water level sensor 1019 is at the top of the tub 1020, and installed in the protrusion portion 1018 extending to the front side from the rear panel 1010.

The protrusion portion 1018 extends to the front side from the rear panel 1010, the attachment/detachment hole 1018a is on the top surface of the protrusion portion 1018, and the water level sensor 1019 is on the front surface of the protrusion portion 1018.

The water level sensor 1019 has a hook thereon. When the hook is inserted through the front surface of the protrusion portion 1018, the hook is inserted into the protrusion portion 1018 to mount the water level sensor 1019.

When the water level sensor 1019 needs to be replaced because of washing operations over a long term, an operator inserts a tool into the attachment/detachment hole 1018a to push the hook to the outside of the protrusion portion 1018. Then, the water level sensor 1019 may be easily removed.

The tub 1020 includes a front panel 1050 having an opening 1053 therein, and the front panel 1050 is supported by a hinge 1062 to connect the door 1060 which opens and closes the opening 1053.

The hinge 1062 is at one side of the opening 1053 and has a curved panel shape extending in a vertical direction, and rotatable supports 1062a extending from the upper and lower parts thereof are connected to the door 1060.

The rear panel 1010 includes the box unit 1030 that surrounds the tub 1020, and the box unit 1030 includes the cover unit 1032 that covers the front panel 1050.

Figure 36:
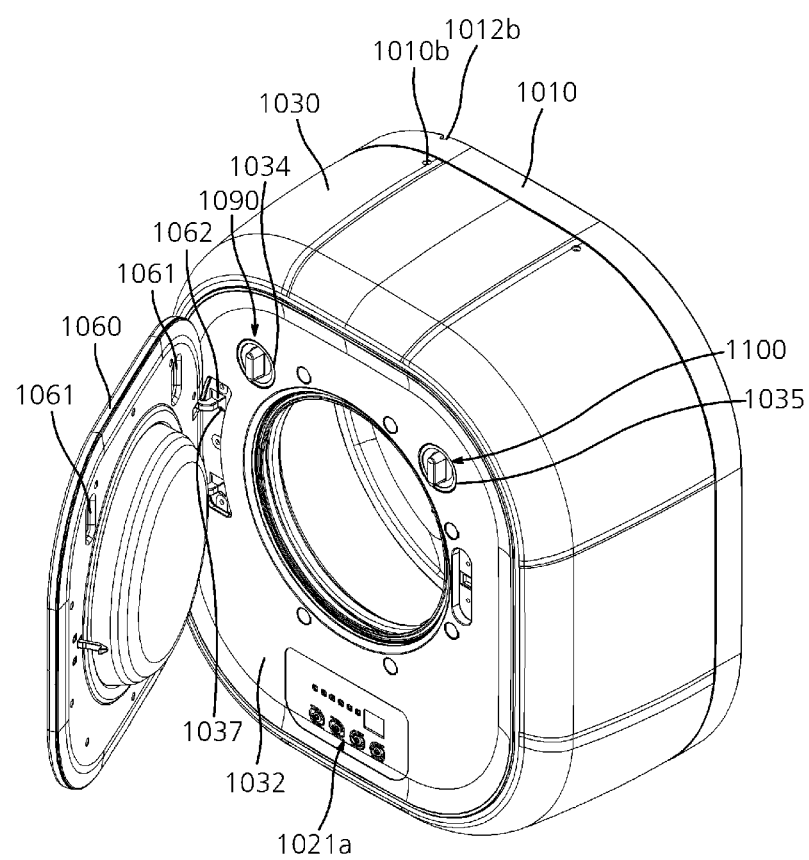
FIG. 36 is a perspective view illustrating a state in which the door for the wall-mounted drum type washing machine in accordance with another embodiment of the present invention is open.

The hinge 1062 connected to the door 1060 is supported by a coupling member that couples to the front panel 1050 through the cover unit 1032 (refer to FIG. 36).

The front panel 1050 has a larger thickness than the cover unit 1032, and includes a plurality of reinforcement ribs formed on the front surface thereof. Therefore, a support force to support the door 1060 is improved.

Figure 37:
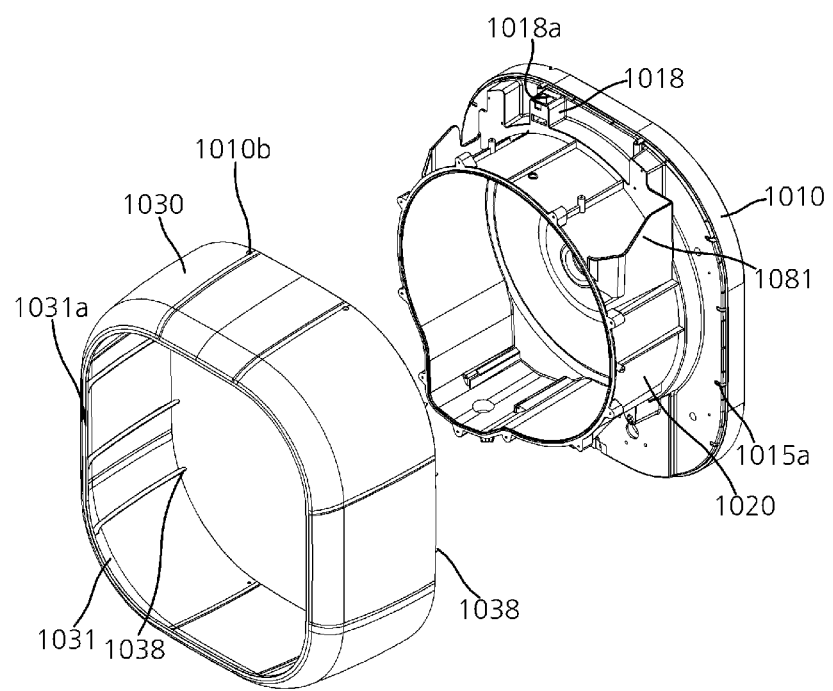
FIG. 37 is an exploded view of a box unit mounting structure for a wall-mounted drum type washing machine in accordance with another embodiment of the present invention.
Figure 38:
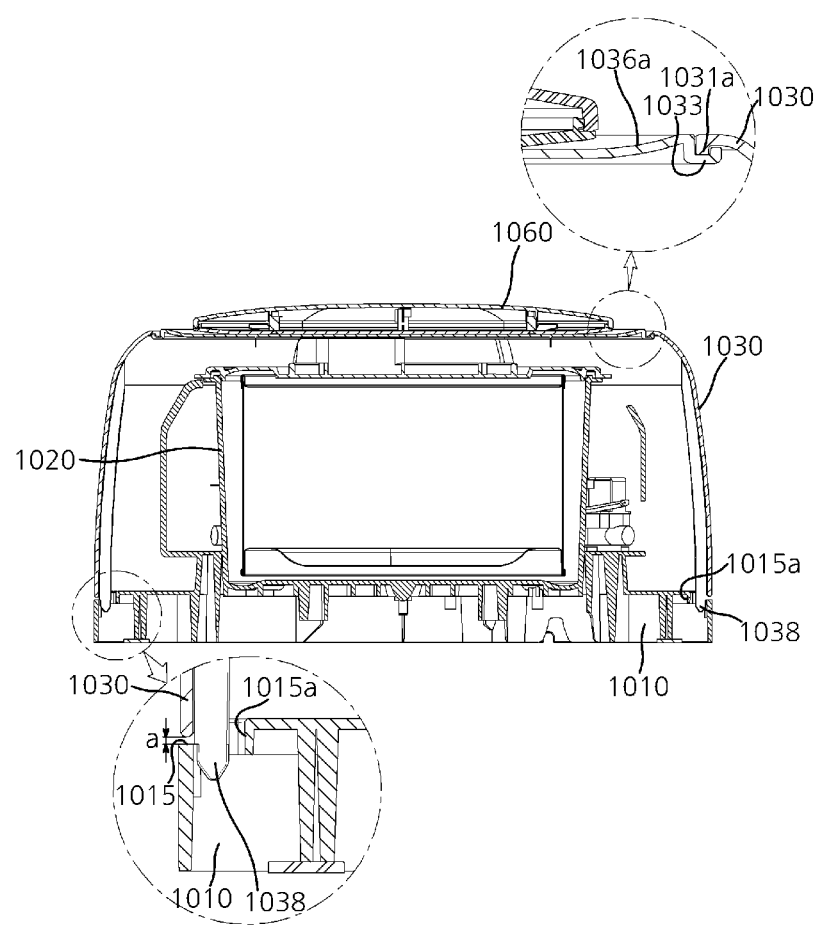
FIG. 38 is a cross-sectional view of a connection structure between guide protrusions and guide grooves in a wall-mounted drum type washing machine in accordance with another embodiment of the present invention.

FIG. 36 is a perspective view illustrating an open door on the wall-mounted drum type washing machine in accordance with the additional embodiment of the present invention. FIG. 37 is an exploded view of a box unit mounting structure for a wall-mounted drum type washing machine in accordance with the additional embodiment of the present invention. FIG. 38 is a cross-sectional view of a connection structure between guide protrusions and guide grooves for a wall-mounted drum type washing machine in accordance with the additional embodiment of the present invention.

Figure 39:
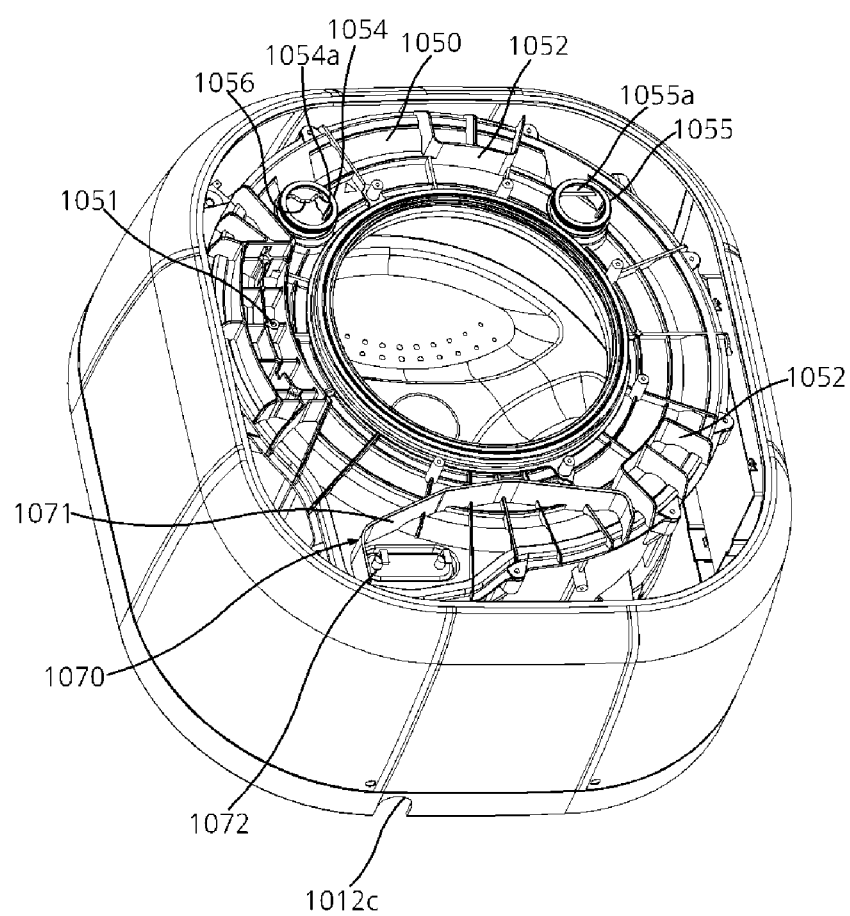
FIG. 39 is a perspective view illustrating a bypass unit for a wall-mounted drum type washing machine in accordance with another embodiment of the present invention.

FIG. 39 is a perspective view illustrating a bypass unit for a wall-mounted drum type washing machine in accordance with the additional embodiment of the present invention. FIG. 40 is a perspective view of the front panel and the bypass unit in the wall-mounted drum type washing machine in accordance with the additional embodiment of the present invention.

Referring to FIGS. 36 to 40, the wall-mounted drum type washing machine in accordance with an embodiment of the present invention further includes a control unit 1021 on the front panel 1050 and a bypass unit 1070 to direct wash water away from the control unit 1021.

The control unit 1021 is installed at the bottom of the front surface of the front panel 1050 and connected to the manipulation unit 1021a on the cover unit 1032.

The bypass unit 1070 is located over the control unit 1021. Therefore, any leaking wash water flowing downward along the outer surface of the tub 1020 drops in the side directions of the tub 1020 by the bypass unit 1070.

Accordingly, it is possible to prevent malfunction and damage of the drum type washing machine that may occur when water contacts the control unit 1021.

The bypass unit 1070 includes a bypass rib 1071 between the control unit 1021 and the opening 1053.

The wash water flowing downward along the outer surface of the tub 1020 is guided toward the edge of the tub 1020 along the bypass rib 1071, which makes it possible to prevent the wash water from flowing toward or dripping onto the control unit 1021.

The bypass rib 1071 is elongated in a lateral direction, and opposed lateral ends of the bypass rib 107 curved to form a curved surface in a downward direction.

Therefore, wash water dripping onto the top surface of the bypass rib 1071 flows toward both ends of the bypass rib 1071.

Below the bypass rib 1071, a heater 1072 is installed to heat wash water in the tub.

The heater 1072 receives power to heat wash water in the tub 1020 and is connected to an electric device. The electric device of the heater 1072 does not come into contact with wash water because of the bypass rib 1071.

The water supply device 1074 and 1074a (refer to FIG. 26) is connected to the top of the rear panel 1010, and the rear panel 1010 includes the drain unit 1080 (refer to FIGS. 32 and 33) which prevents wash water dropping from the water supply device 1074 and 1074a from flowing toward the control unit 1021.

The water supply device 1074 and 1074a include a plurality of water supply valves 1074 (refer to FIG. 26) on the rear panel 1010 and a water supply pipe 1074a connecting the water supply valves 1074 to the tub 1020 and connecting the water supply valves 1074 to a water supply source.

The water supply pipe 1074a passes into the rear surface of the rear panel 1010 through the second through-hole 1012c (refer to FIG. 25) at the bottom of the rear panel 1010, and extends to the top of the rear panel 1010 along the circumferential surface of the tub 1020 where it is connected to the water supply valves 1074.

When the water supply valve 1074 malfunctions or is broken, wash water supplied by the water supply pipe 1074a may flow downward along the circumferential surface of the tub 1020.

In the wall-mounted drum type washing machine in accordance with an embodiment of the present invention, the drain unit 1080 discharges the wash water flowing toward the bottom of the tub 1020 to the outside of the rear panel 1010.

The drain unit 1080 includes a blocking rib 1081, a drain hole 1082, and a guide rib 1083. The blocking rib 1081 extends from the tub 1020. The drain hole 1082 formed in the rear panel 1010 so as to face the blocking rib 1081. The guide rib 1083 guides wash water flowing through the drain hole 1082 toward the circumference of the rear panel 1010.

The blocking rib 1081 having a funnel shape is formed over both sides of the tub 1020, and integrally formed with the circumferential surface of the tub 1020.

Therefore, the wash water flowing along the tub 1020 is contained in the blocking rib 1081.

The drain hole 1082 is at the bottom of a funnel-shaped space formed by the blocking rib 1081 and the circumferential surface of the tub 1020, and through the rear panel 1010 such that the front surface 1010*a* and the rear surface of the rear panel 1010 communicate with each other.

Therefore, any wash water flowing along the circumferential surface of the tub 1020 from the water supply valves 1074 is collected by the blocking rib 1081, and moved toward the rear surface of the rear panel 1010 through the drain hole 1082.

The guide rib 1083 has a ring shape on the rear surface of the rear panel 1010, and the drain hole 1082 is placed outside the guide rib 1083 and formed through the front and rear surfaces of the rear panel 1010.

The wash water flowing along the circumferential surface of the tub 1020 is collected by the blocking rib 1081, moved toward the rear surface of the rear panel 1010 through the drain hole 1082, and then moved toward the circumference of the rear panel 1010 along the guide rib 1083. Then, the wash water flows downward.

The wall-mounted drum type washing machine in accordance with an embodiment of the present invention further includes an elastic assembling unit 1039 (refer to FIG. 26) to connect the box unit 1030 and the rear panel 1010 and generate an elastic force between the cover unit 1032 and the box unit 1030.

The box unit 1030 and the cover unit 1032 form the outer wall of the wall-mounted drum type washing machine, and provide an elastic force to each other.

Therefore, the box unit 1030 and the cover unit 1032 are assembled by applying an external force in a reverse direction of the elastic force generated by the box unit 1030 and the cover unit 1032.

Even after the box unit 1030 and the cover unit 1032 are assembled, an elastic force to restore the box unit 1030 and the cover unit 1032 to the original state still exists.

Therefore, the coupling force among the box unit 1030, the cover unit 1032, and the rear panel 1010 is improved by the elastic force.

The elastic assembling unit 1039 includes a ring portion 1031*a,* a lock groove 1033, and the receiving portion 1015. The ring portion 1031*a* is in the connection hole 1031. The lock groove 1033 is in the cover unit 1032, and the ring portion 1031*a* is inserted into the lock groove 1033. The receiving portion 1015 is on the rear panel 1010 and receives the box unit 1030.

The box unit 1030 has a connection hole 1031 at the front, and the cover unit 1032 is installed over the connection hole 1031. The ring portion 1031*a* in the connection hole 1031 is inserted into the lock groove 1033 on the circumference of the cover unit 1032.

The receiving portion 1015 is behind the end of the box unit 1030, and after assembly, a gap a is formed between the end of the box unit 1030 and the receiving portion 1015 when the box unit 1030 having the cover unit 1032 thereon is on the rear panel 1010 (refer to FIG. 30).

Therefore, when the box unit 1030 and the cover unit 1032 are on the rear panel 1010 having the front panel 1050 thereon after assembly of the box unit 1030 and the cover unit 1032, there is a gap between the end of the box unit 1030 and the receiving portion 1015.

When the box unit 1030 and the rear panel 1010 are assembled, the operator presses the front surface of the box unit 1030 toward the receiving portion 1015 until the end of the box unit 1030 is directly attached to the receiving portion 1015, while the cover unit 1032 and the box unit 1030 are deformed. Then, the box unit 1030 and the rear panel 1010 are coupled to each other.

The box unit 1030 and the rear panel 1010 have a plurality of assembling holes 1010*b* at the top and bottom thereof and coupled to the coupling members. Specifically, two assembling holes 1010*b* are at the top, and two assembling holes 1010*b* are at the bottom.

Therefore, after the box unit 1030 is completely assembled, the coupling members are not exposed to the front surface of the box unit 1030 and the cover unit 1032.

The receiving portion 1015 has guide grooves 1015*a* therein, and the box unit 1030 has guide protrusions 1038 inserted into the guide grooves 1015*a*.

Therefore, when the box unit 1030 is placed on the receiving portion 1015, the guide protrusions 1038 of the box unit 1030 are inserted into the guide grooves 1015*a*. Then, the box unit 1030 may be assembled at a precise position on the rear panel 1010.

The cover unit 1032 has a mounting hole 1036 therein over which the door 1060 is installed, and a curved surface portion 1036*a* inclined towards the outside of the box unit 1030 from the mounting hole 1036 toward the lock groove 1033 (refer to FIG. 28).

The circumference of the cover unit 1032 has a shape that extends to the front, due to the curved surface portion 1036*a*.

Therefore, when pressure is put on the box unit 1030 toward the receiving portion 1015 and the cover unit 1032 and the box unit 1030 are coupled, the end of the box unit 1030 moves toward the receiving portion 1015 while the curved surface portion 1036*a* is straightened.

The cover unit 1032 includes a mounting groove 1037 between the mounting hole 1036 and the curved surface portion 1036*a* through which the hinge 1062 of the door 1060 passes.

After the hinge 1062 is received in the mounting groove 1037, the coupling member is coupled to the front panel 1050 and the hinge 1062 through the mounting groove 1037.

Therefore, although the hinge 1062 seems to be coupled to the cover unit 1032, the hinge 1062 is supported by the front panel 1050.

The front panel 1050 includes first and second supports 1051 and 1052 integrated therein. The first support 1051 is coupled to the hinge 1062, and the second support 1052 supports the cover unit 1032.

The coupling member passing through the hinge 1062 and the mounting groove 1037 is coupled to the first support 1051.

When pressure is put on the cover unit 1032 and the box unit 1030 toward the receiving portion 1015, the second support 1052 serves as a lever. Therefore, as the curved surface portion 1036*a* of the cover unit 1032 is straightened, the rear end of the box unit 1030 moves toward the receiving portion 1015.

Figure 41:
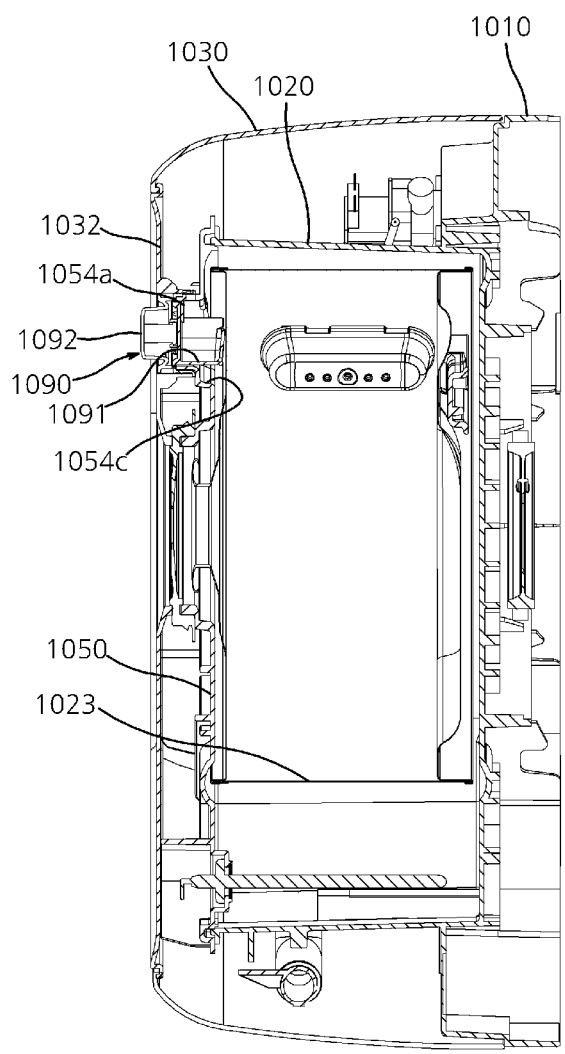
FIG. 41 is a cross-sectional view of a detergent box mounting structure for a wall-mounted drum type washing machine in accordance with another embodiment of the present invention.
Figure 42:
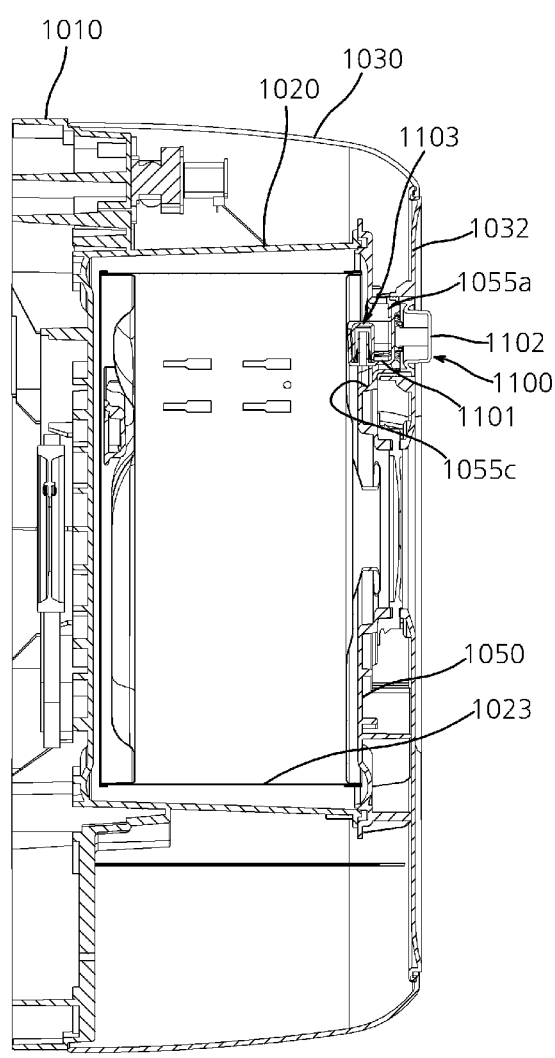
FIG. 42 is a cross-sectional view of a conditioner box mounting structure for a wall-mounted drum type washing machine in accordance with another embodiment of the present invention.
Figure 43:
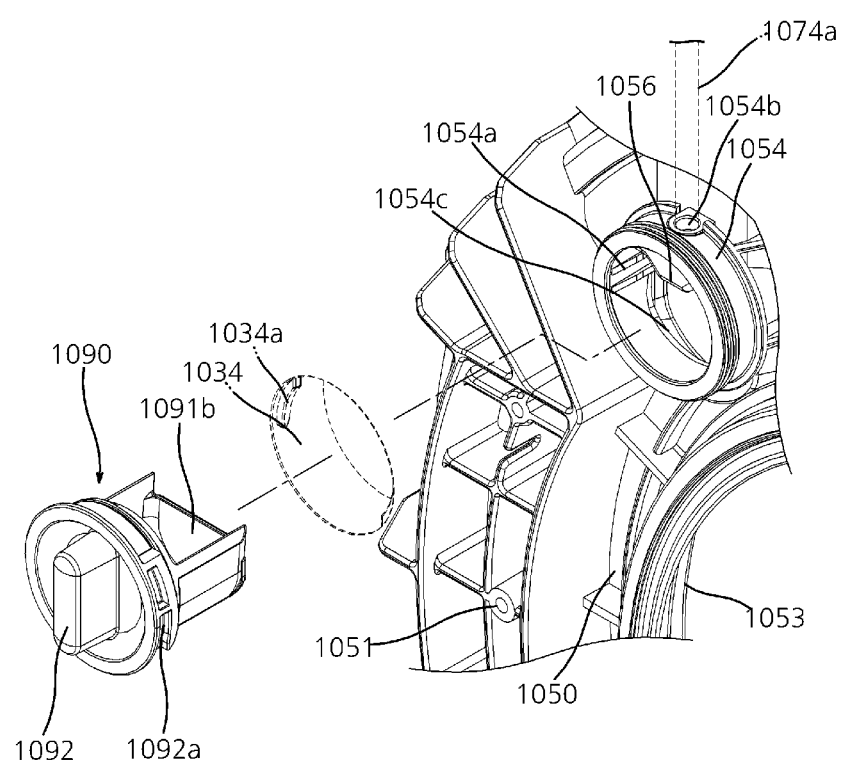
FIG. 43 is an exploded perspective view of the detergent box mounting structure for the wall-mounted drum type washing machine in accordance with another embodiment of the present invention.
Figure 44:
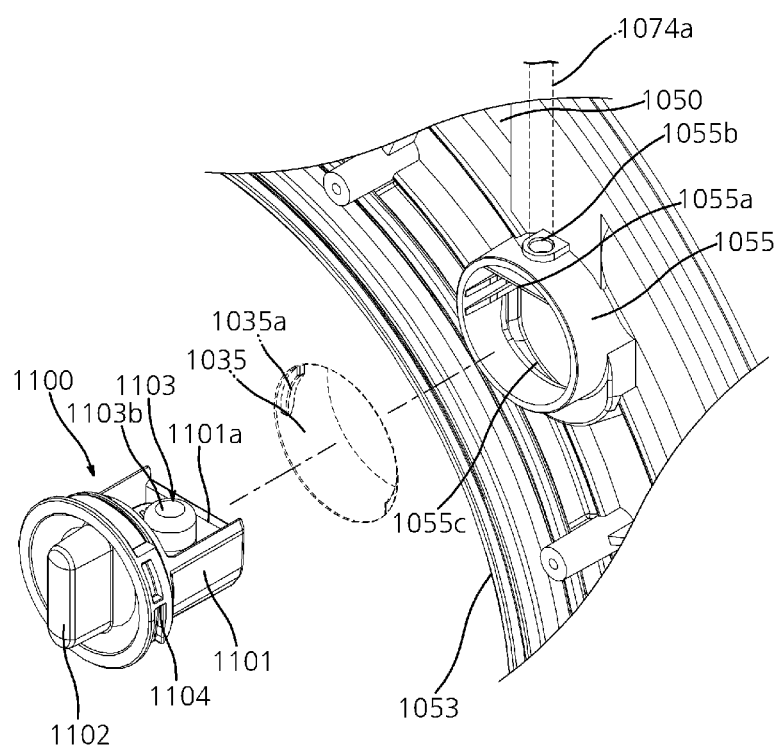
FIG. 44 is an exploded perspective view of the conditioner box mounting structure for the wall-mounted drum type washing machine in accordance with another embodiment of the present invention.

FIG. 41 is a cross-sectional view of the wall-mounted drum type washing machine including a detergent box mounting structure in accordance with an additional embodiment of the present invention. FIG. 42 is a cross-sectional view of the wall-mounted drum type washing machine including a conditioner box mounting structure in accordance with an additional embodiment of the present invention. FIG. 43 is an exploded perspective view of the detergent box mounting structure for a wall-mounted drum type washing machine in accordance with the additional embodiment of the present invention. FIG. 44 is an exploded perspective view of the conditioner box mounting structure for a wall-mounted drum type washing machine in accordance with the additional embodiment of the present invention.

Figure 45:
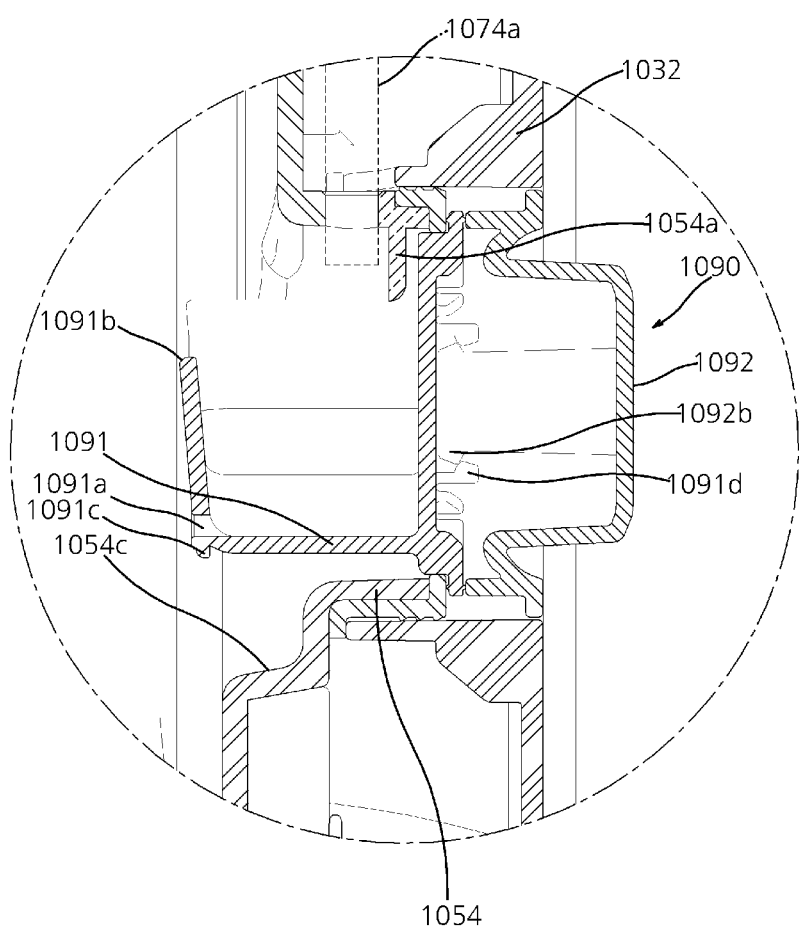
FIG. 45 is an expanded cross-sectional view of the detergent box mounting structure for the wall-mounted drum type washing machine in accordance with another embodiment of the present invention.
Figure 46:
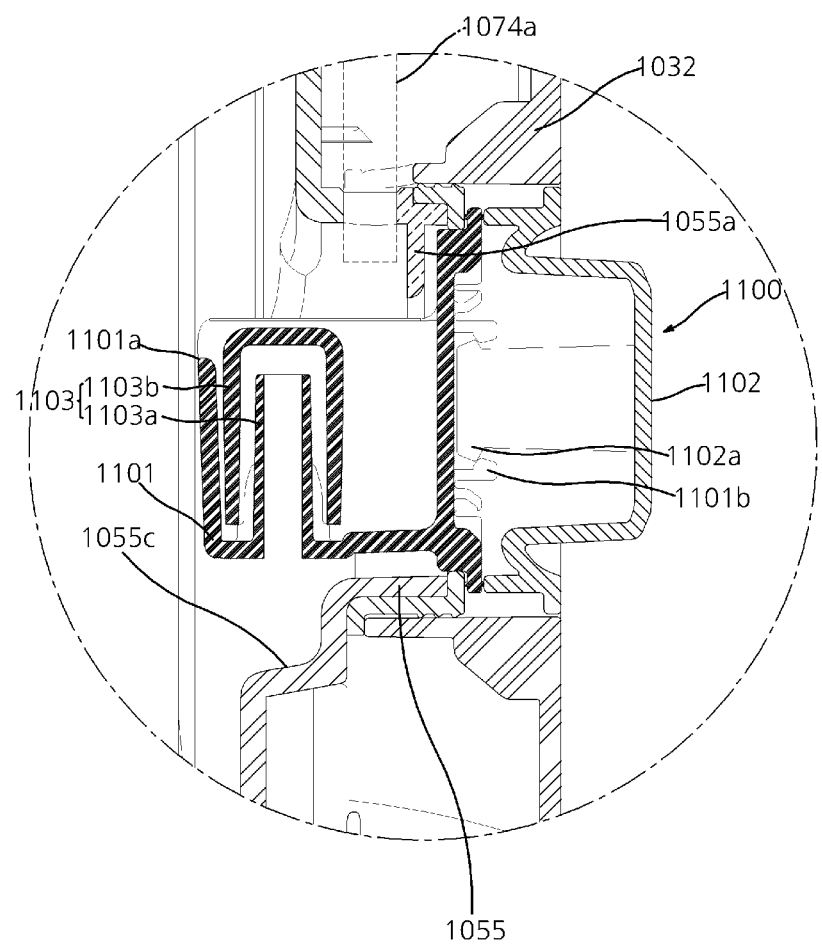
FIG. 46 is an expanded cross-sectional view of the conditioner box mounting structure for the wall-mounted drum type washing machine in accordance with another embodiment of the present invention.
Figure 47:
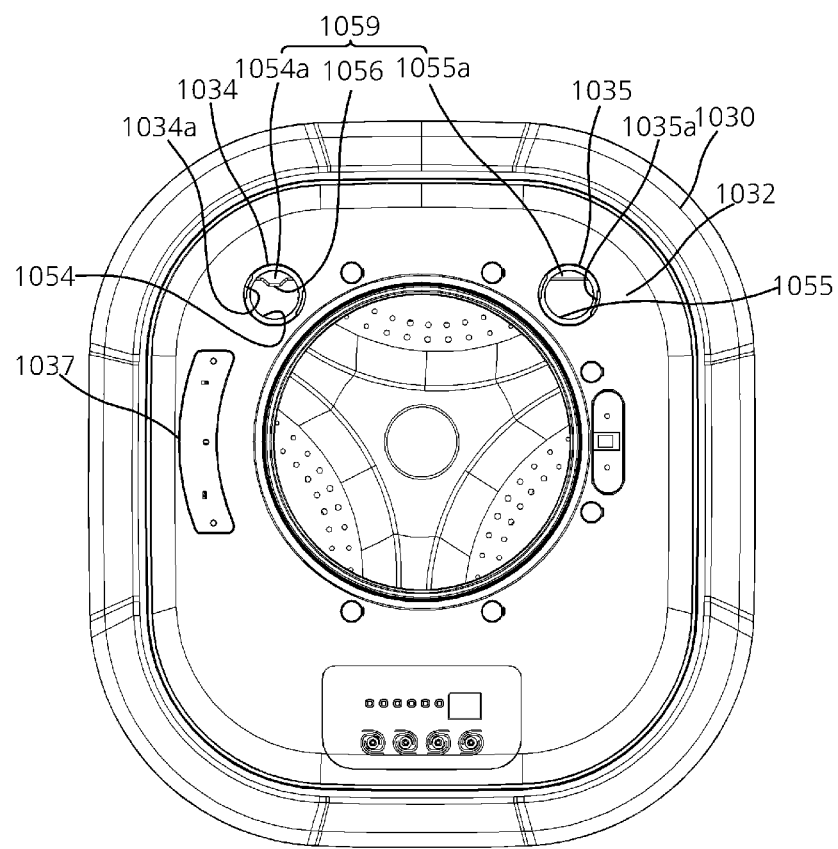
FIG. 47 is a diagram illustrating a misassembling prevention unit for a wall-mounted drum type washing machine in accordance with another embodiment of the present invention.

FIG. 45 is an expanded cross-sectional view of the detergent box mounting structure for a wall-mounted drum type washing machine in accordance with the additional embodiment of the present invention. FIG. 46 is an expanded cross-sectional view of the conditioner box mounting structure for a wall-mounted drum type washing machine in accordance with the additional embodiment of the present invention. FIG. 47 is a diagram illustrating a misassembling prevention unit for a wall-mounted drum type washing machine in accordance with the additional embodiment of the present invention.

Referring to FIGS. 41 to 47, the wall-mounted drum type washing machine in accordance with an embodiment of the present invention further includes a detachable detergent box 1090 that extends through the front panel 1050 and the cover unit 1032.

Since the wall-mounted drum type washing machine in accordance with an embodiment of the present invention is mounted on the wall surface W, a distance between the box unit 1030 and the tub 1020 housing the small drum 1056, and a distance between the cover unit 1032 and the front panel 1050 are preferably a small value.

Therefore, in this embodiment of the present invention, the detergent box 1090 is not installed in the cover unit 1032 or the box unit 1030, but detachably inserted through the front panel 1050 through the cover unit 1032.

The front panel 1050 has a first insertion hole 1054 into which the detergent box 1090 is inserted, and the first insertion hole 1054 has a first water supply hole 1054b connected to the water supply pipe 1074a.

The first insertion hole 1054 faces toward the front side from the front surface of the front panel 1050, and the first water supply hole 1054b receiving water from the water supply pipe 1074a is at the top of the circumferential surface of the first insertion hole 1054.

Since the water supply pipe 1074a is inserted and connected to the first water supply hole 1054b water leakage does not occur between the water supply pipe 1074a and the first water supply hole 1054b.

Furthermore, since the detergent box 1090 is detachable from the first insertion hole 1054, and the water supply pipe 1074a is connected to the first water supply hole 1054b, a separate detergent box 1090 is not in the box unit 1030 or the cover unit 1032, but detergent and wash water are mixed in the front panel 1050 and then directly supplied into the tub 1020.

The detergent box 1090 includes a first housing 1091 and a first handle 1092. The first housing 1091 is inserted into the first insertion hole 1054. The first handle 1092 is rotatable and connected to the first housing 1091, and the detachable detergent box 1090 is coupled to the front panel 1050.

The first housing 1091 has a container shape of which the top surface is open, and the first rotatable handle 1092 is coupled to the front surface of the first housing 1091.

For example, when the first handle 1092 is rotated after the first housing 1091 is inserted into the first insertion hole 1054, a locking operation is performed between the first handle 1092 and a first lock hole 1034 of the cover unit 1032.

When the first handle 1092 is rotated, the first housing 1091 and the first handle 1092 are idle with respect to each other. In such a case, the first housing 1091 does not rotate.

The first housing 1091 has a remaining water hole 1091a therein. Therefore, wash water supplied to the tub 1020 through the first housing 1091 does not remain in the first housing 1091, but is discharged into the tub 1020 through the remaining water hole 1091a.

The remaining water hole 1091a is at the bottom of the first housing 1091, and sloped toward the inside of the tub 1020.

Therefore, wash water discharged through the remaining hole 1091a from the first housing 1091 is collected in the tub 1020.

The remaining water hole 1091a has a backflow prevention protrusion 1091c to prevent wash water from flowing back.

Therefore, wash water discharged from the first housing 1091 does not flow back through the gap between the first housing 1091 and the first insertion hole 1054.

The backflow prevention protrusion 1091c extends downward from the bottom surface of the remaining water hole 1091a.

Therefore, wash water that would otherwise enter the gap between the first housing 1091 and the first insertion hole 1054 along the bottom surface of the first housing 1091, that is, the bottom surface of the remaining water hole portion 1091a, instead collects on the backflow prevention protrusion 1091c and then drops into the tub 1020.

The first insertion hole 1054 has a first step 1054c to prevent wash water from entering the gap between the first housing 1091 and the first insertion hole 1054.

The first step 1054c comprises the lower portion of the first insertion hole 1054 downward.

As the gap between the first housing 1091 and the first insertion hole 1054 increases, wash water that would otherwise enter the gap between the bottom surface of the first housing 1091 and the first insertion hole 1054 is instead discharged toward the tub 1020.

The first housing 1091 has a first induction panel 1091b on the rear surface of the first housing 1091 and having a smaller height than side surfaces thereof. Therefore, when wash water supplied to the first housing 1091 overflows, the overflowing wash water is supplied to the tub 1020 by the first induction panel 1091b.

The first induction panel 1091b of the first housing 1091 has a smaller height than the side surface panels thereof.

Therefore, when wash water supplied by the first water supply hole 1054b is stored in the first housing 1091, and then overflows from first housing 1091, the wash water drops toward the tub 1020 over the top of the first induction panel 1091b.

The wall-mounted drum type washing machine in accordance with an embodiment of the present invention further includes a detachable conditioner box 1100 in the second insertion hole 1055 through the cover unit 1032.

When a washing operation is performed with a fabric conditioner in the conditioner box 1100, wash water is supplied to the conditioner box 1100 during a rinsing step. Then, the conditioner and the wash water are supplied into the tub 1020.

The conditioner box 1100 includes a second housing 1101 and a second handle 1102. The second housing 1101 is inserted into the second insertion hole 1055 and has a siphon 1103 therein. The second handle 1102 is rotatable, connected to the second housing 1101, and detachably coupled to the front panel 1050.

The second housing 1101 has a container shape of which the top surface is open, and the second rotatable handle 1102 is coupled to the front surface of the second housing 1101.

Therefore, when the second handle 1102 is rotated after the second housing 1101 is inserted into the second insertion hole 1055, a locking operation is performed between the second handle 1102 and a second lock hole 1035 in the cover unit 1032.

When the second handle 1102 is rotated, the second housing 1101 and the second handle 1102 are idle with respect to each other. In such a case, the second housing 1101 does not rotate.

The second housing 1101 has the siphon 1103 therein. Therefore, when wash water is supplied to the second housing 1101, the wash water and the fabric conditioner do not remain in the second housing 1101, but are discharged toward the tub 1020, due to the siphon effect.

The second insertion hole 1055 has a second step 1055c to discharge wash water toward the tub 1020 that would otherwise enter a gap between the second housing 1101 and the second insertion hole 1055.

The second step 1055c comprises a lower portion of the second insertion 1055 downward.

As the gap between the second housing 1101 and the second insertion hole 1055 increases, wash water that would otherwise enter the gap between the bottom of the second housing 1101 and the second insertion hole 1055 does not enter, but rather, flows toward the tub 1020.

The second housing 1101 includes a second induction panel 1101a on the rear surface thereof and having a smaller height than side surfaces thereof. Therefore, when wash water supplied to the second housing 1101 overflows, the overflowing wash water is supplied to the tub 1020 by the second induction panel 1101a.

The second induction panel 1101a of the second housing 1101 may have a smaller height than side surfaces thereof.

Therefore, when the wash water supplied by the second supply hole 1055b is stored in the second housing 1101, and then overflows from the second housing 1101, the wash water flows toward the tub 1020 over the top of the second induction panel 1101a.

The bottom surface of the second housing 1101 is declined toward the siphon 1103.

The wash water or fabric conditioner remaining on the bottom surface of the second housing 1101 moves toward the siphon 1103 along the declined bottom surface. Therefore, the wash waster or fabric conditioner does not remain in the second housing 1101 due to the operation of the siphon 1103.

The siphon 1103 includes a discharge pipe 1103a and a lid 1103b. The discharge pipe 1103a extends upward from the bottom surface of the second housing 1101. The lid 1103b is spaced a predetermined distance from the discharge pipe 1103a and covers the top of the discharge pipe 1103a.

When wash water is supplied to the second housing 1101 containing fabric conditioner, the wash water and the conditioner are discharged toward the discharge pipe 1103a through the gap between the discharge pipe 1103a and the lid 1103b due to the siphon effect.

Furthermore, the wall-mounted drum type washing machine in accordance with an embodiment of the present invention includes a misassembling prevention unit 1059 to prevent the detergent box 1090 and the conditioner box 1100 from being switched and inserted.

Since the first and second housing portions 1091 and 1101 have a similar shape and size, a user may switch and insert the detergent box 1090 and the conditioner box 1100.

In the wall-mounted drum type washing machine in accordance with an embodiment of the present invention, the misassembling prevention unit 1059 prevents the detergent box 1090 and the conditioner box 110 from being switched and inserted.

Therefore, it is possible to prevent a user's mistake. Specifically, a washing operation may not start when the conditioner box 1100 is inserted into the first insertion hole 1054 and the detergent box 1090 is inserted into the second insertion hole 1055.

The first handle 1092 has a first lock 1092a thereon, and the first lock hole 1034 of the cover unit 1032 into which the first handle 1092 is inserted has a first stopper 1034a that restricts the rotation of the first lock 1092a.

The first handle 1092 has a first coupling groove 1091d on the rear surface thereof, into which a first rotatable hook 1092b of the first housing 1091 is inserted. Therefore, when the first handle 1092 and the first housing 1091 are connected, they are idle with respect to each other.

The first handle 1092 has a pair of first lock portions 1092a on the circumferential surface thereof, and the first lock hole 1034 of the cover unit 1032 has a pair of first stoppers 1034a at a predetermined distance from each other so that the first lock portions 1092a lock to the first stoppers 1034a.

The first stoppers 1034a have a shape that extends to the center from the circumference of the first lock hole 1034, arranged at two positions along the circumference of the first lock hole 1034 spaced from each other.

When the first handle 1092 is inserted into the first lock hole 1034 and then rotated while the first lock portions 1092a and the first stoppers 1034a are spaced from each other, the first lock portions 1092a and the first stoppers 1034a overlap each other.

Therefore, the first handle 1092 is locked so as not to be easily removed from the first lock hole 1034.

Since the first handle 1092 and the first housing 1091 are idle with respect to each other, it is possible to prevent the detergent in the first housing 1091 from pouring.

The second handle 1102 has a pair of second lock portions 1104 thereon, and the second lock hole 1035 of the cover unit 1032, into which the second handle 1102 is inserted, has a pair of second stoppers 1035a to restrict the rotation of the second lock 1104.

The second handle 1102 has a second coupling groove 1101b on the rear surface thereof, into which a second rotatable hook 1102a of the second housing 1101 is inserted. Therefore, when the second handle 1102 and the second housing 1101 are connected, they are idle with respect to each other.

The second handle 1102 has the pair of second lock portions 1104 on the circumferential surface thereof, and the second lock hole 1035 of the cover unit 1032 has the pair of second stoppers 1035a a predetermined distance from each other so that the second lock portions 1104 lock to the second stoppers 1035a.

The second stoppers 1035a have a shape that extends towards the center from the circumference of the second lock hole 1035, and are at two positions along the circumference of the second lock hole 1035 spaced at a predetermined distance from each other.

When the second handle 1102 is inserted into the second lock hole 1035 and then rotated while the second lock portions 1104 and the second stoppers 1035a are spaced from each other, the second lock portions 1104 and the second stoppers 1035a overlap each other.

Therefore, the second handle 1102 is locked so as not to be easily removed from the second lock hole 1035.

Since the second handle 1102 and the second housing 1101 are idle with respect to each other, it is possible to prevent the fabric conditioner in the second housing 1101 from pouring.

The first lock hole 1034 has a first blocking panel 1054a extending from a top thereof, toward the first housing 1091, and the second lock hole 1035 has a second blocking panel 1055a extending from a top thereof toward the second housing 1101.

The first blocking panel 1054a is above the first housing 1091 when the first housing 1091 is inserted, and close to the first handle 1092 when the first housing 1091 is inserted into the first insertion hole 1054.

Therefore, when wash water is supplied by the first water supply hole 1054b, the wash water overflowing to the outside of the first housing 1091 may be prevented from leaking toward the first handle 1092.

The second blocking panel 1055a is at the top of the second housing 1101 when the second housing 1101 is inserted, and close to the second handle 1102 when the second housing 1101 is inserted into the second insertion hole 1055.

When wash water is supplied to the second water supply hole 1055b, the wash water overflowing to the outside of the second housing 1101 may be prevented from leaking toward the second handle 1102.

The misassembling prevention unit 1059 includes a blocking portion 1056 in the first blocking panel 1054a extending from the first insertion hole 1054 toward the first housing 1091 and interfering with the siphon 1103.

The siphon 1103 in the second housing 1101 has an elongated shape that extends toward the top of the second housing 1101.

When the second housing 1101 is inserted into the first insertion hole 1054, the siphon 1103 and the blocking 1056 interfere with each other, and the second housing 1101 cannot be inserted into the first insertion hole 1054.

Therefore, it is possible to prevent a user's mistake. For example, a washing operation may be prevented from being started when the detergent box 1090 and the conditioner box 1100 are switched and inserted.

Furthermore, the door 1060 on the front panel 1050 has a sensing groove 1061 into which the first and second handle portions 1092 and 1102 are inserted (refer to FIG. 36).

When the door 1060 is closed and the first and second handle portions 1092 and 1102 are not completely locked, the first and second handle portions 1092 and 1102 cannot be inserted correctly into the sensing groove 1061.

Therefore, the user cannot close the door 1060 when the first and second handle portions 1092 and 1102 are not completely locked. As such, when the drum type washing machine is not operated correctly, a normal washing operation cannot be performed.

Figure 48:
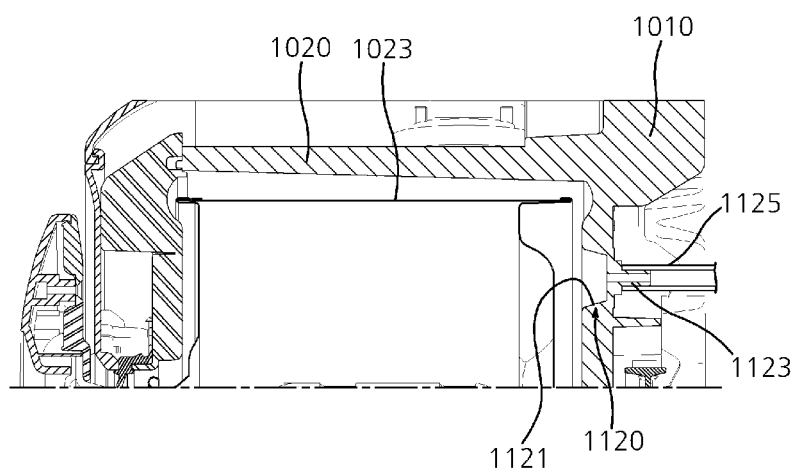
FIG. 48 is a cross-sectional view of an overflow prevention unit for a wall-mounted drum type washing machine in accordance with another embodiment of the present invention.

FIG. 48 is a cross-sectional view of an overflow prevention unit for a wall-mounted drum type washing machine in accordance with an additional embodiment of the present invention.

Referring to FIGS. 25 and 48, the wall-mounted drum type washing machine in accordance with an embodiment of the present invention further includes an air discharge port 1123 and a clogging prevention portion 1120. The air discharge port 1123 is in the rear panel 1010 and discharges air from the tub 1020. The clogging prevention portion 1120 serves to prevent the air discharge port 1123 from clogging.

Through the air discharge port 1123 at the top of the central portion of the rear panel 1010, high-pressure air inside the tub 1020 is discharged to the outside of the tub 1020.

The air discharge port 1123 includes an air discharge pipe 1125 to guide the air from the tub 1020 to the outside, and the air discharge pipe 1125 extends toward the second through-groove 1012c by the guide unit 1012.

The air discharge pipe 1125 may be coupled to the installation hole 1013a, and the cable member 1013b is wound around the air discharge pipe 1125, like the power line 1011a.

The clogging prevention portion 1120 includes a de-foaming portion 1121 in the rear panel 1010 that expands the end portion of the air discharge port 1123.

Since the de-foaming portion 1121 has a larger diameter than the air discharge port 1123, the de-foaming portion 1121 prevents the air discharge port 1123 from clogging with foam or the like formed inside the tub 1020.

The clogging prevention portion 1120 further includes a guide unit 1012 in the rear panel 1010 that extends the air discharge pipe 1125 connected to the air discharge port 1123 toward a higher position than the air discharge port 1123.

Both of the power line 1011a and the air discharge pipe 1125 may be inserted into the guide unit 1102. When the cable member 1013b wound around the air discharge pipe 1125 is coupled to the installation hole 1013a by the coupling member 1016a, the air discharge pipe 1125 may be secured or fixed to the fixing portion 1012a.

The air discharge pipe 1125 along the inside of the fixing portion 1012a extends toward the bottom of the rear panel 1010, and is exposed to the outside of the rear panel 1010 through the second through-groove 1012c.

Figure 49:
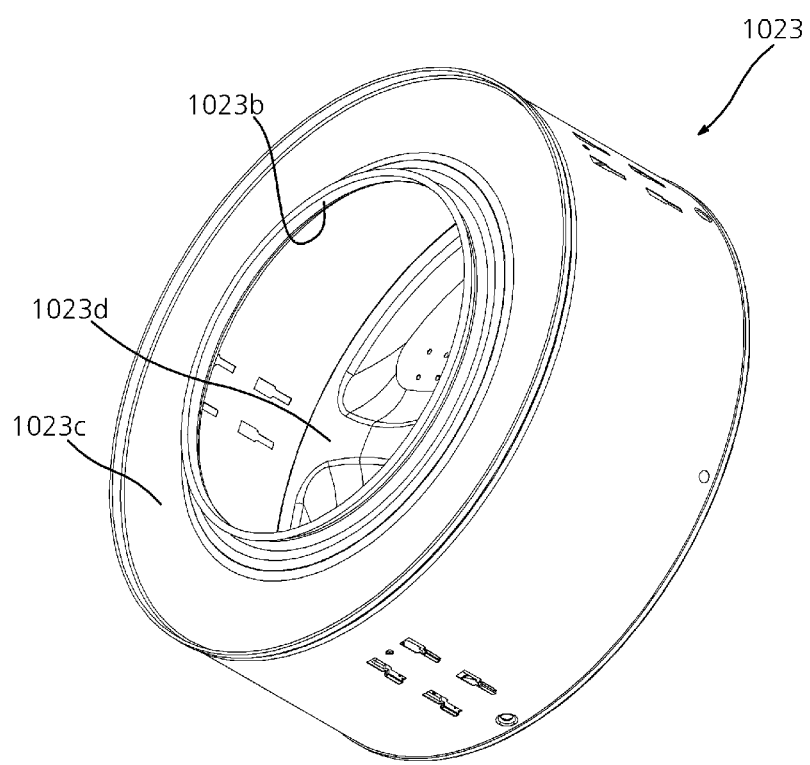
FIG. 49 is a front perspective view illustrating a drum for a wall-mounted drum type washing machine in accordance with another embodiment of the present invention.
Figure 50:
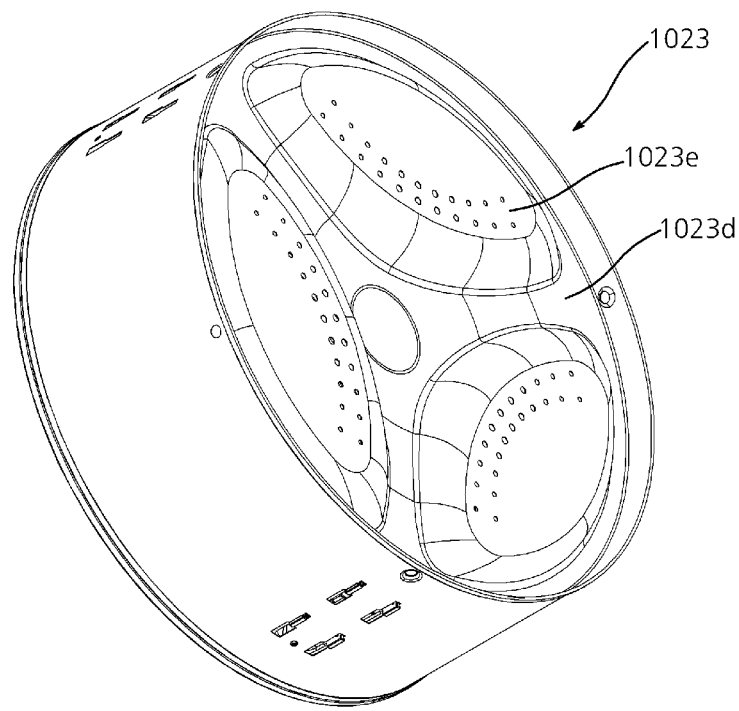
FIG. 50 is a rear perspective view illustrating the drum for a wall-mounted drum type washing machine in accordance with another embodiment of the present invention.

FIG. 49 is a front perspective view illustrating a drum for a wall-mounted drum type washing machine in accordance with an additional embodiment of the present invention. FIG. 50 is a rear perspective view illustrating the drum for a wall-mounted drum type washing machine in accordance with the additional embodiment of the present invention. FIG. 51 is cross-sectional view illustrating the drum for a wall-mounted drum type washing machine in accordance with the additional embodiment of the present invention.

Referring to FIGS. 49 to 51, the drum 1023 of the wall-mounted drum type washing machine in accordance with the additional embodiment of the present invention has a larger diameter B than the depth A of the drum 1023. The depth A of the drum 1023 indicates a distance from the front surface 1023c to the rear surface 1023d of the drum 1023.

Since the diameter B of the drum 1023 is larger than the depth A thereof, that is, the diameter B is relatively large and the depth A is relatively small, the front-to-rear length of the drum 1023 may be reduced when the same capacity is to be implemented.

Since the front-to-rear length of the wall-mounted drum type washing machine is reduced, it is possible to reduce the protrusion distance of the drum type washing machine from the wall surface W.

In accordance with of the present invention, the depth A of the drum 1023 is from 120 to 130 mm. When the drum 1023 has a depth of less than 120 mm, it may be difficult to house the laundry easily between the front surface 1023c and the rear surface 1023d of the drum 1023. Therefore, it may be inconvenient to put the laundry into the drum.

Furthermore, when the drum 1023 has a depth of more than 130 mm, the front-to-rear length of the drum type washing machine may increase so that the drum type washing machine occupies a large installation space. Therefore, the exterior quality of the wall-mounted drum type washing machine may be degraded, and the increased space occupied by the drum type washing machine may reduce a user's action radius.

Therefore, when the depth A of the drum 1023 is 120 to 130 mm, it becomes easy to put the laundry in the drum, and the exterior quality of the drum type washing machine is improved. Furthermore, the protrusion distance of the drum type washing machine is reduced, which can increase a user's action radius.

The diameter B of the drum 1023 is 3~3.2 times larger than the depth A of the drum 1023.

When the diameter B of the drum 1023 is less than three times larger than the depth A of the drum 1023, the depth A of the drum 1023 may increase disproportionately. Therefore, the protrusion distance of the drum type washing machine from the wall surface W increases.

Therefore, as described above, when the front-to-rear length of the drum type washing machine increases so that the drum type washing machine occupies a relatively large installation space. Accordingly, the exterior appearance of the wall-mounted drum type washing machine degrades, and the space occupied by the drum type washing machine increases and reduces a user's action radius.

When the diameter B of the drum 1023 is more than 3.2 times larger than the depth A of the drum 1023, the horizontal and vertical sizes of the washing machine increase. Therefore, the area of the wall surface W for mounting the drum type washing machine increases, making it difficult to install the drum type washing machine.

Therefore, when the diameter B of the drum 1023 is 3~3.2 times larger than the depth A of the drum 1023, it becomes easy to put the laundry stably in the drum, the exterior appearance of the drum type washing machine improves, the protrusion distance of the drum type washing machine decreases, and a user's action radius increases.

Furthermore, the shortest distance C from the circumference of the drum 1023 to an input hole 1023*b* is set 0.4~0.8 times the depth A of the drum 1023.

When the shortest distance C from the circumference of the drum 1023 to the input hole 1023*b* is less than 0.4 times the depth A of the drum 1023, the space available for housing the laundry is reduced and may make it inconvenient to put the laundry in the drum. In this case, the laundry put into the drum 1023 may come out of the drum 1023.

Furthermore, when the shortest distance C from the circumference of the drum 1023 to the input hole 1023*b* is more than 0.8 times the depth A of the drum 1023, the size of the input hole 1023*b* is reduced and makes it inconvenient to take out the laundry.

Therefore, when the shortest distance C from the circumference of the drum 1023 to the input hole 1023*b* is 0.4~0.8 times the depth A of the drum 1023, it becomes easy to put the laundry in the drum, and the exterior appearance of the drum type washing machine is improved. Furthermore, the protrusion distance of the drum type washing machine is reduced to increase a user's action radius.

The drum 1023 includes a plurality of protrusions 1023*e* on the rear surface 1023*d* thereof, and the protrusions 1023*e* are spaced from each other and connected to the driving unit 1040.

A method of installing the wall-mounted drum type washing machine in accordance with an additional embodiment of the present invention will be described as follows.

First, when the wall-mounted drum type washing machine is installed, four coupling members 1016*a* are inserted into the wall W, and the buffer member 1016*c* is placed around the coupling members 1016*a*. Then, the rear panel 1010 is mounted on the wall surface W by inserting the coupling members 1016*a* into the through-hole portions 1016 of the rear panel 1010.

The nut members 1016*b* are then coupled to the coupling members 1016 extending toward the front surface 1010*a* of the rear panel 1010 through the through-hole portions 1016*b*, until the nut members 1016*b* are directly attached to the front surface 1010*a*.

Then, when the cover unit 1032 and the box unit 1030 are assembled and the box unit 1030 is placed over the rear panel 1010, the end of the box unit 1030 is received on the receiving portion 1015, and the guide protrusions 1038 are inserted into the guide grooves 1015*a*. Then, the box unit 1030 is at a precise position on the rear panel 1010.

The end of the box unit 1030 is spaced a predetermined distance from the receiving portion 1015. The operator presses the box unit 1030 and the cover unit 1032 toward the receiving portion 1015 and inserts the coupling members 1016*a* into upper and lower portions of the box unit 1030, thereby coupling the box unit 1030 to the rear panel 1010.

After the installation of the wall-mounted drum type washing machine is completed, the box unit 1030, the cover unit 1032, and the rear panel 1010 are fastened by an elastic force between the box unit 1030 and the cover unit 1032. Therefore, the coupling force among the respective parts is improved.

When a washing operation is to be performed, the user opens the door 1060, puts the laundry into the drum 1023, removes the detergent box 1090 and the conditioner box 1100, puts detergent into the first housing 1091 and fabric conditioner into the second housing 1101, and inserts the first and second housings 1091 and 1101 into the first and second insertion holes 1054 and 1055, respectively.

The first insertion hole 1054 has a blocking portion 1056 extending downward from a first blocking panel 1054*a*. Therefore, when the conditioner box 1100 is inserted into the first insertion hole 1054, the siphon 1103 and the blocking portion 1056 interfere with each other. Accordingly, it is possible to prevent the detergent box 1090 and the conditioner box 1100 from being switched and inserted.

After the detergent box 1090 and the conditioner box 1100 are inserted into the first and second insertion holes 1054 and 1055, the first and second handles 1092 and 1102 are rotated to overlap the first and second lock portions 1092*a* and 1104 with the first and second stoppers 1034*a* and 1035*a*, respectively. Accordingly, the detergent box 1090 and the conditioner box 1100 are locked.

Then, when the user presses the manipulation unit to start a washing operation, the water supply valves are opened to supply wash water to the tub 1020.

The wash water supplied to the detergent box 1090 through the first water supply hole 1054*b* by the water supply pipe 1074*a* is stored in the first housing 1091.

As the wash water is continuously supplied, the wash water overflows from the top of the first induction panel 1091*b*, thereby supplying wash water and detergent into the tub 1020.

When the supply of wash water is completed, the motor 1041 is driven according to an operation signal transmitted from the control block 1022, and power transmitted along the belt 1043 from the rotating shaft 1041*a* of the motor 1041 rotates the driving wheel 1042 and the drum 1023 to perform the washing operation.

In this embodiment of the present invention, since the tub 1020, the rear panel 1010, and the reinforcement unit 1014 are integral with each other, it is possible to prevent the tub 1020 from moving due to vibrations generated while the drum 1023 is rotated. Furthermore, the buffer member 1016c between the rear panel 1010 and the wall surface W may prevent vibrations of the drum 1023 from being transmitted to the wall surface W.

Accordingly, it is possible to provide a drum type washing machine which may be installed on the wall surface and that includes a power line having multiple extension directions.

Embodiments of the present invention have been disclosed above for illustrative purposes. Those skilled in the art will appreciate that various modifications, additions and substitutions are possible, without departing from the scope and spirit of the invention as disclosed in the accompanying claims.

In the embodiments of the present invention, the wall-mounted drum type washing machine has been taken as an example for description. However, this is only an example, and the wall-mounted drum type washing machine in accordance with embodiments of the present invention may be applied to other products.

The scope of the invention should be limited only by the accompanying claims.

What is claimed is:

1. A wall-mounted washing machine comprising:
   a tub configured to contain washing water, wherein the tub comprises a tub side wall and a tub rear panel integrally formed with the tub side wall, and wherein the tub rear panel is operable to serve as a mounting member to mount the wall-mounted washing machine on an external wall;
   a tub front panel coupled to the tub side wall;
   a plurality of ribs formed integrally with the tub front panel and on a front surface of the tub front panel, and
   a water supply unit,
   wherein the tub front panel comprises a first container holder configured to hold a detergent box,
   wherein the first container holder comprises a first water supply hole coupled to the water supply unit,
   wherein the tub front panel further comprises a second container holder configured to hold a conditioner box, and wherein the second container holder comprises a second water supply hole coupled to the water supply unit,
   wherein the first container holder further comprises a first blocking panel extending from a top surface of the first container holder and toward the detergent box, and
   wherein the second container holder comprises a second blocking panel extending from a top surface of the second container holder and toward the conditioner box.

2. The wall-mounted washing machine of claim 1, wherein the plurality of ribs comprise a plurality of reinforcement ribs operable to reinforce mechanical strength of the tub front panel.

3. The wall-mounted washing machine of claim 1 further comprising:
   a bypass unit disposed on the front surface of the tub front panel; and
   a control unit disposed under the bypass unit and configured to control operation of the wall-mounted washing machine,
   wherein the bypass unit is formed integrally with the tub front panel and configured to shield the control unit from washing water.

4. The wall-mounted washing machine of claim 3, wherein the control unit is disposed at a bottom of the front surface of the tub front panel.

5. The wall-mounted washing machine of claim 3, wherein the bypass unit comprises a bypass rib, wherein the bypass rib is laterally elongated, and wherein opposite lateral ends of the bypass rib are bent downward.

6. The wall-mounted washing machine of claim 5, wherein the opposite lateral ends of the bypass rib form downward curved surfaces.

7. The wall-mounted washing machine of claim 5, wherein the control unit is disposed under the bypass rib and on the front surface of the tub front panel.

8. The wall-mounted washing machine of claim 5 further comprising: a heater coupled to the front surface of the tub front panel and under the bypass rib, wherein the heater is configured to heat washing water, wherein the heater extends through the tub front panel and is disposed inside the tub.

9. The wall-mounted washing machine of claim 8, wherein the tub front panel comprises a heater connection hole, and wherein the heater is inserted in the heater connection hole.

10. The wall-mounted washing machine of claim 1 further comprising;
    a control unit positioned under a bypass unit on the front surface of the tub front panel and configured to control operation of the wall-mounted washing machine; and
    a cover unit covering the tub front panel and operable to protect the control unit from contacting washing water.

11. The wall-mounted washing machine of claim 10, wherein the control unit is installed at the bottom of the front surface of the tub front panel.

12. The wall-mounted washing machine of claim 1 further comprising:
    a connection hole formed in the tub front panel, and
    a heater which is installed on the front surface of the tub front panel and inserted into the inside of the tub through the connection hole for heating washing water, wherein the heater is supported by the connection hole and operable to be removed from the connection hole.

13. The wall-mounted washing machine of claim 1,
    wherein the first container holder comprises a first step configured to prevent washing water from entering a first gap formed between the detergent box and the first container holder, and
    wherein the second container holder comprises a second step configured to prevent washing water from entering a second gap between the conditioner box and the second container holder.

14. The wall-mounted washing machine of claim 1,
    wherein the first container holder comprises a blocking member extending downward from the first blocking panel,
    wherein the conditioner box comprises a siphon configured to drain liquid contained therein,
    wherein the siphon is elongated and extends toward a top of the conditioner box, and
    wherein the blocking member is configured to prevent the conditioner box from being placed in the first container holder by interference with the siphon.

15. The wall-mounted washing machine of claim 14, wherein a bottom surface of the conditioner box declines toward the siphon.

16. The wall-mounted washing machine of claim 1, further comprising a misassembling prevention unit formed in the conditioner box and configured to prevent the detergent box from being inserted into the second container holder.

17. The wall-mounted washing machine of claim 1, further comprising:
   a door installed on the tub front panel; and
   sensing grooves formed on a rear surface of the door and configured to facilitate positioning of the detergent box and the conditioner box when the door is closed.

18. The wall-mounted washing machine of claim 1, wherein the tub front panel comprises,
   an opening formed in the tub front panel;
   a door coupled to the tub front panel;
   a hinge for coupling the door to the tub front panel; and
   a support mount portion formed integrally with the tub front panel, wherein the hinge is supported on the support mount portion.

19. The wall-mounted washing machine of claim 18 further comprising a cover unit detachably coupled to the tub front panel and configured to cover the tub front panel,
   wherein the tub front panel comprises a cover support portion integrated with the tub front panel for supporting the cover unit, and wherein the hinge passes through the cover unit.

* * * * *